United States Patent [19]

Spence

[11] Patent Number: 5,293,539
[45] Date of Patent: Mar. 8, 1994

[54] METHOD AND APPARATUS FOR CALIBRATING TONE REPRODUCTION IN A PROOFING SYSTEM

[75] Inventor: John P. Spence, Webster, N.Y.

[73] Assignee: Eastman Kodak Company, Rochester, N.Y.

[21] Appl. No.: 782,940

[22] Filed: Oct. 25, 1991

[51] Int. Cl.⁵ .......................... H04N 1/40; H04N 1/46
[52] U.S. Cl. .................................. 358/527; 358/406; 358/455
[58] Field of Search .................... 358/358, 75, 455, 80, 358/298, 448, 463, 76, 406, 458

[56] References Cited

U.S. PATENT DOCUMENTS

| | | |
|---|---|---|
| 4,657,831 | 4/1987 | Ambro et al. . |
| 4,708,459 | 11/1987 | Cowan et al. . |
| 4,816,863 | 3/1989 | Lee . |
| 4,926,254 | 5/1990 | Nakatsuka et al. ................. 358/80 |
| 5,018,085 | 5/1991 | Smith, Jr. ........................... 358/80 |

OTHER PUBLICATIONS

F. N. Fritsch et al, "Monotone Piecewise Cubic Interpolation", SIAM Journal of Numerical Analysis, vol. 17, No. 2, Apr. 1980, pp. 238-246.
J. A. C. Yule, Principles of Color Reproduction (©1967: John Wiley & Sons, Inc., New York), specifically pp. 205-216 of Chapter 8 "Additivity and Proportionality of Densities".

*Primary Examiner*—Edward L. Coles, Sr.
*Assistant Examiner*—Scott A. Rogers
*Attorney, Agent, or Firm*—Robert L. Randall

[57] ABSTRACT

Apparatus and associated methods for providing accurate tone reproduction in an output image, specifically in terms of dot gain curve shape and scale, through a DDCP imaging chain (such as that implemented by a raster image processor (200), particularly a screening process (460) occurring therein, and a marking engine (130)) used in a direct digital color proofing (DDCP) system (100), based upon "Process" data (600) associated with that imaging chain and customer defined ("Aim") data (500). Specifically, monotonically interpolated, e.g. using monotone piecewise cubic interpolation, "Aim" and "Process" data for "all possible" inputs are determined from corresponding input "Aim" and "Process" data and then combined to yield a customized dot gain look-up table (460) that, for a given operating condition, reflects the "Aim" data modified by the inverse of the "Process" data, i.e. the latter reflecting the native dot gain characteristic of this imaging chain which occurs at that condition. Thereafter, incoming contone values for a proof image are routed through the look-up table to yield resulting modified values which, when subsequently printed by the DDCP imaging chain at that operating condition, will yield a proof image that exhibits only a desired "Aim" dot gain curve, without substantially any corruption, if at all, from the native dot gain characteristic of that chain. By obtaining and then interpolating appropriate "Process" and/or desired "Aim" data, for a common operating condition and then constructing a look-up table therefrom, the DDCP imaging chain can produce a proof image that, within physical limits occurring at that operating condition, will accurately exhibit only the desired "Aim" dot gain curve and hence the desired tone reproduction characteristic associated therewith.

34 Claims, 21 Drawing Sheets

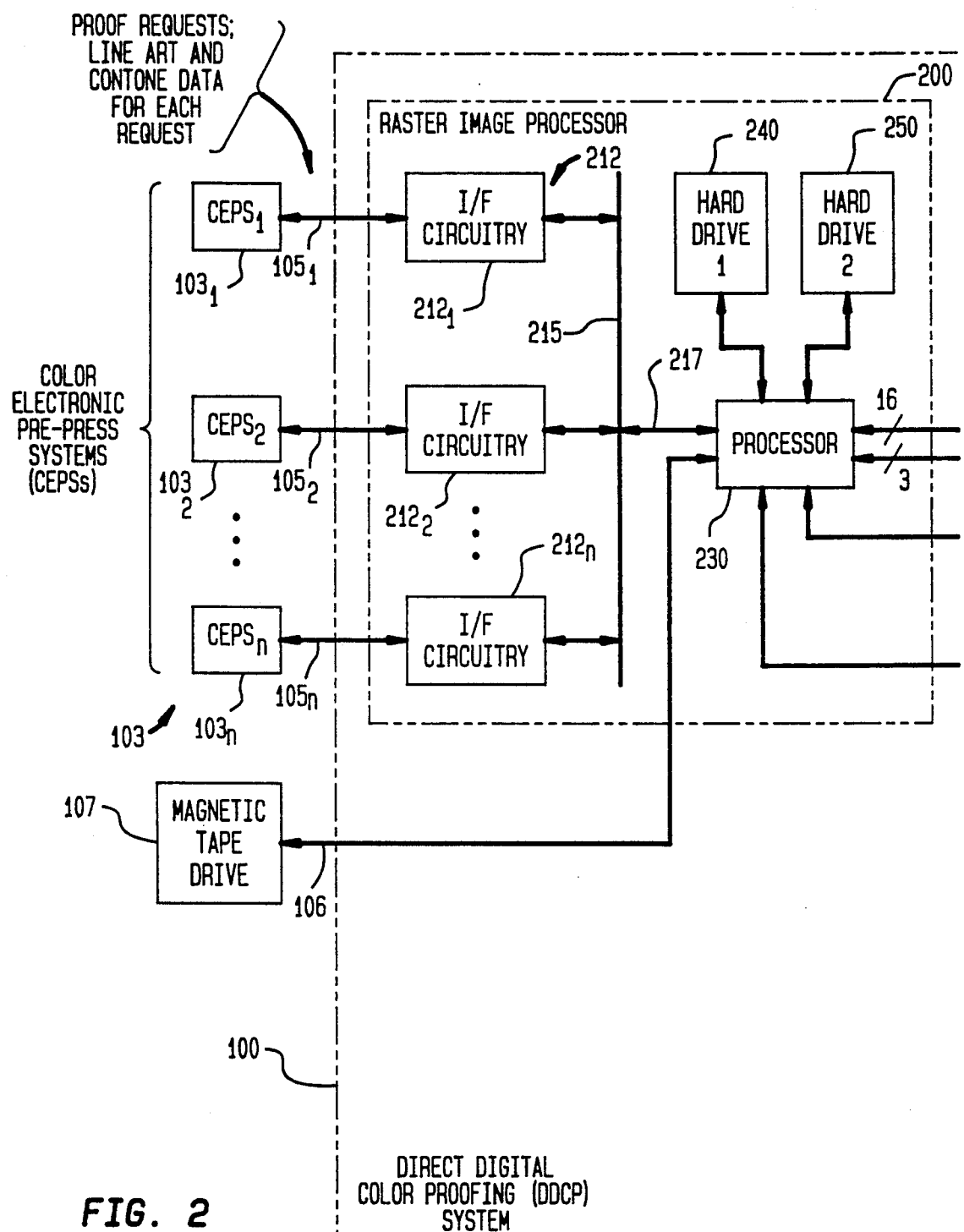

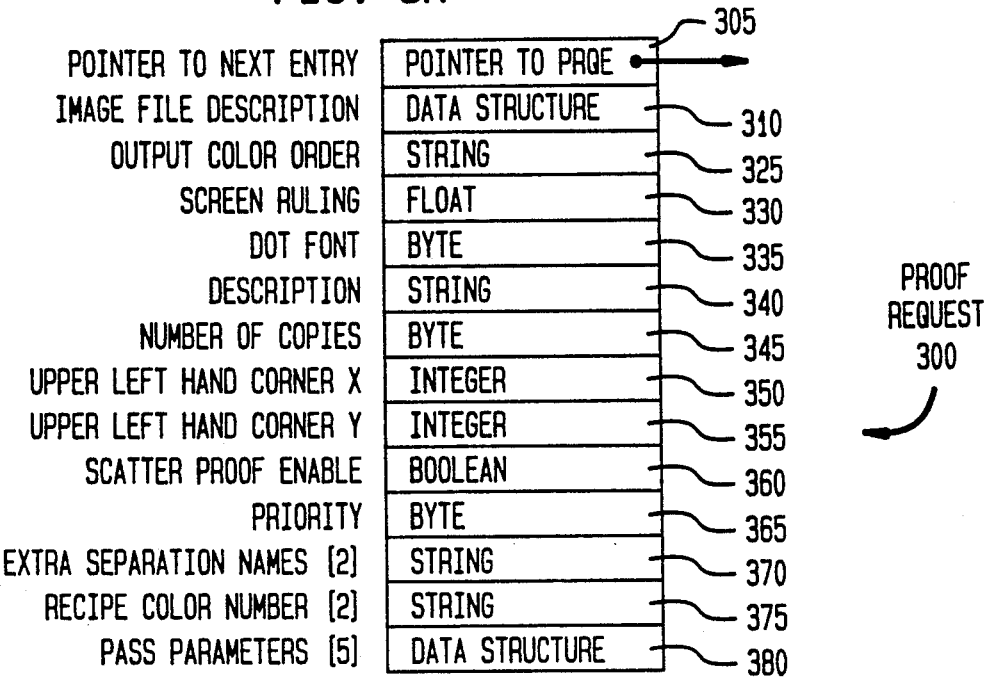
FIG. 3A
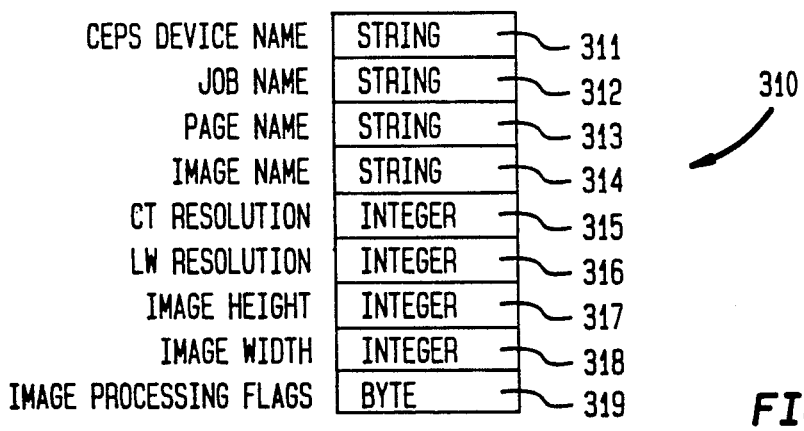
FIG. 3B
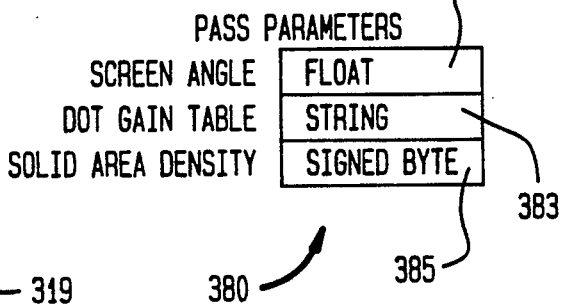
FIG. 3D
FIG. 3C

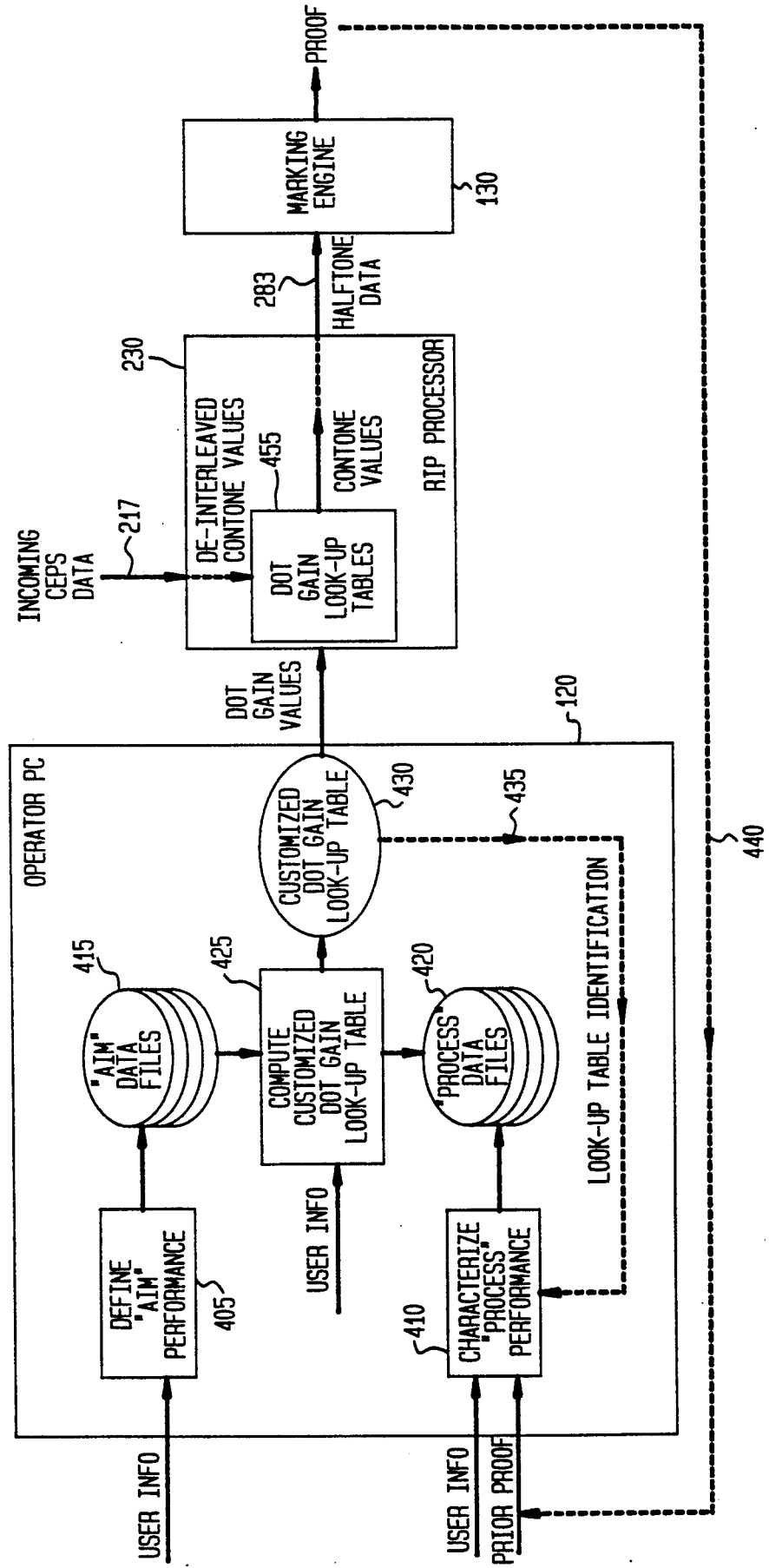

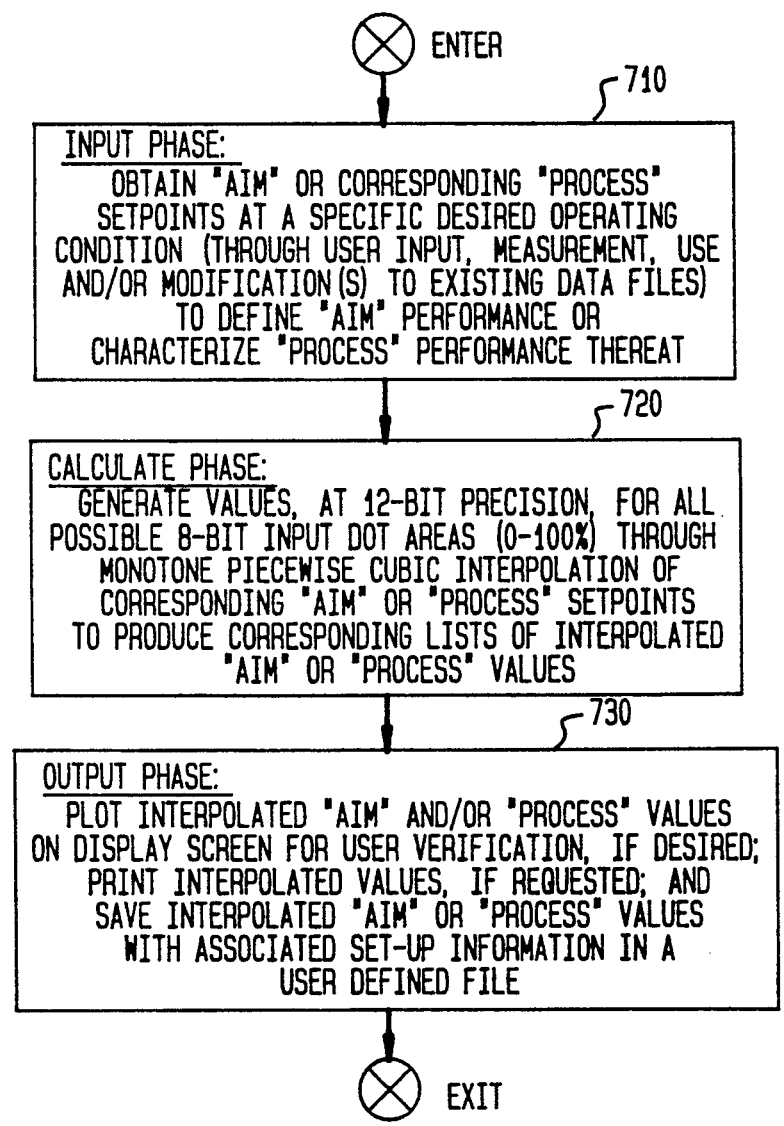

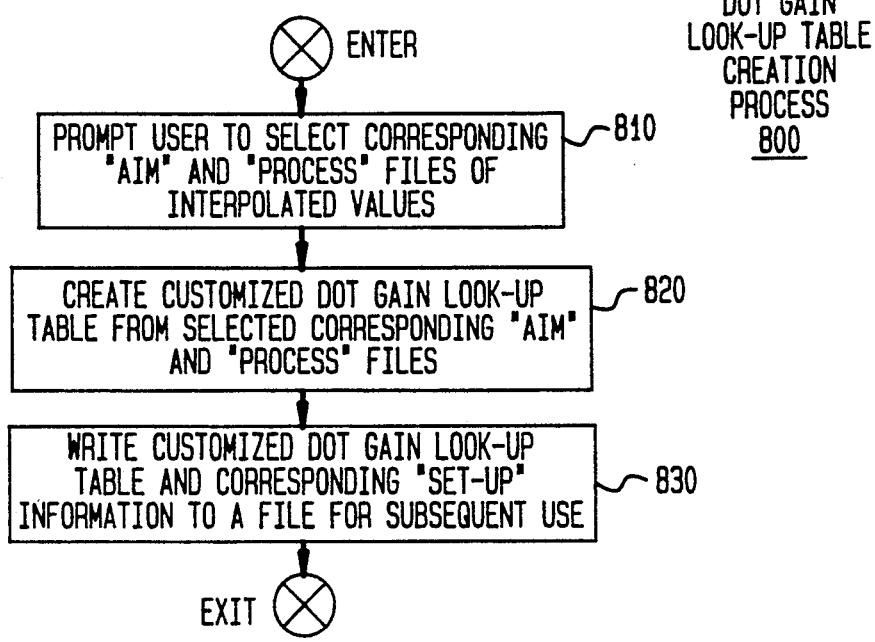
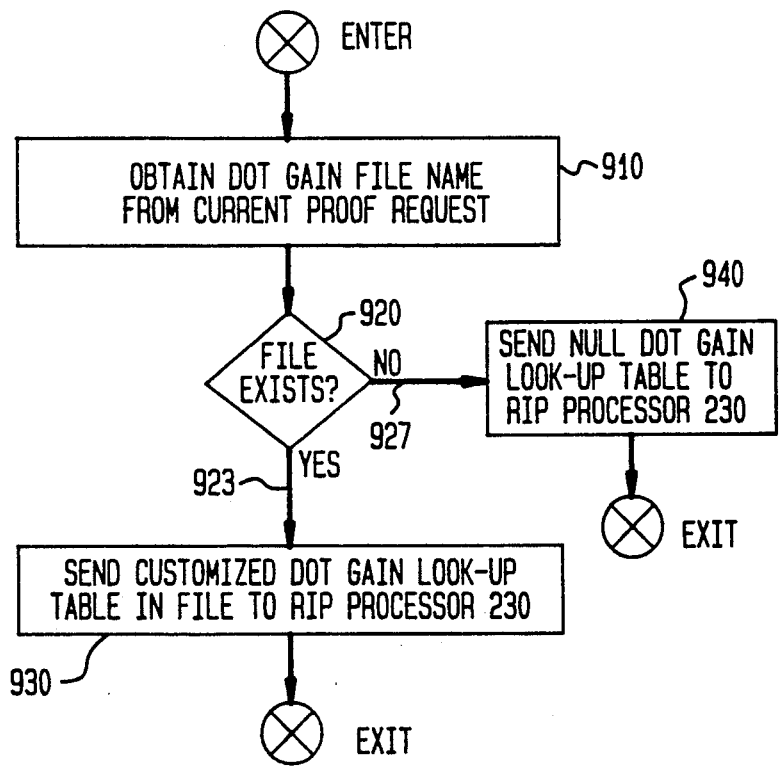

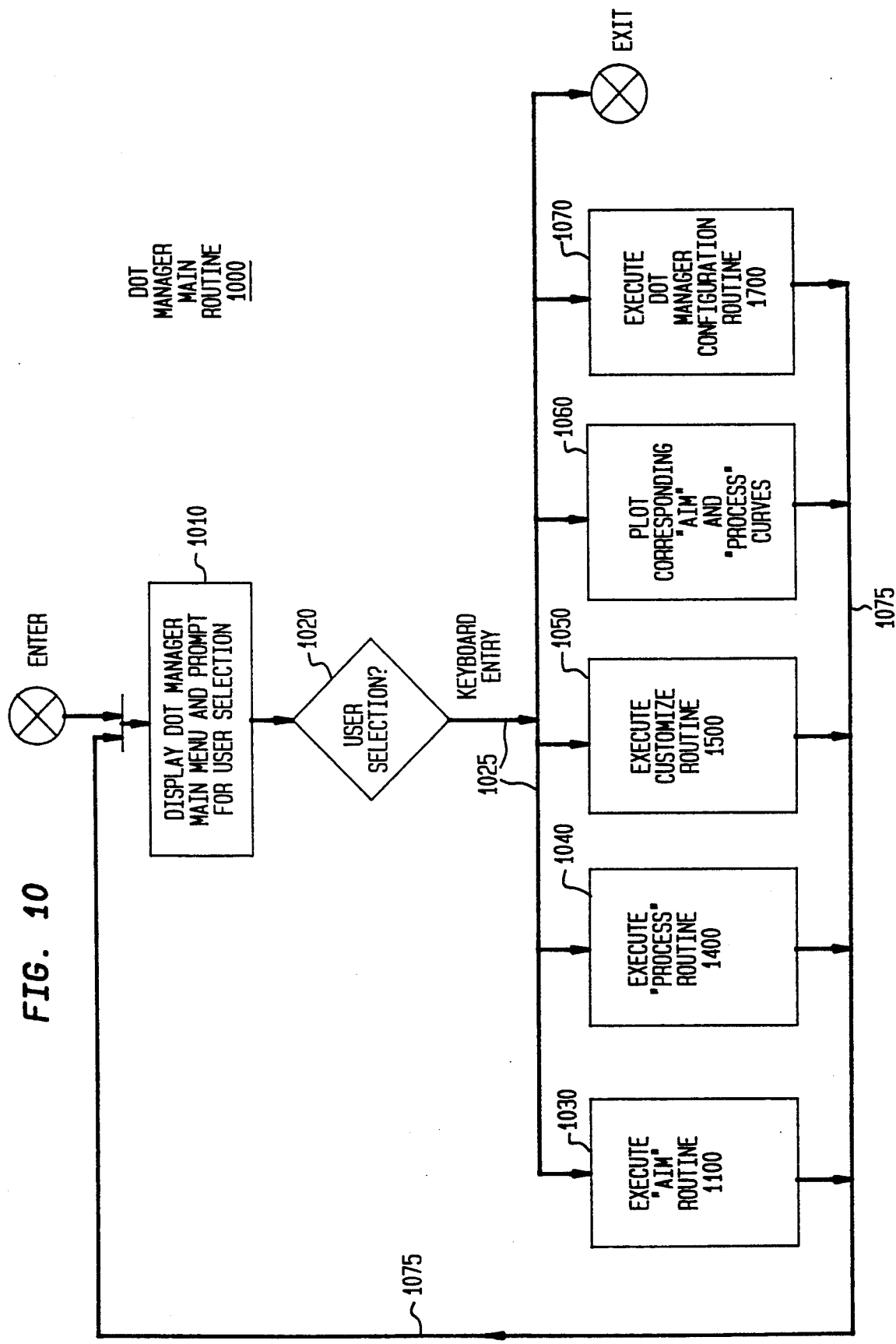

METHOD AND APPARATUS FOR CALIBRATING TONE REPRODUCTION IN A PROOFING SYSTEM

TECHNICAL FIELD OF THE INVENTION

The invention relates to a technique, specifically apparatus and associated methods employed therewith, for providing accurate tone reproduction in an output image, specifically in terms of dot gain curve shape and scale, in density space, through an imaging system, such as an imaging chain used in a direct digital color proofing system and formed of a raster image processor and a binary marking writer, based upon native (so-called "process") dot gain data associated with that chain and customer defined (so-called "aim") dot gain data.

BACKGROUND ART

Graphic arts applications frequently require the accurate reproduction of a high resolution color image (commonly referred to as an "artwork"), such as a color photograph, a color drawing, a color layout and the like. A typical application might involve printing a high resolution color image or a series of such images on a page of a periodical, such as a magazine, or a corporate annual report.

Images are oftentimes generated either photographically, on suitable film, or electronically, on video tape or other suitable electronic media. When generated, images share a basic characteristic: they are recorded on a continuous tone (hereinafter referred to as "contone") basis. As such, the color existing at any point in the image is represented by a continuous amplitude value, oftentimes discretized as eight-bit values ranging from "0" to "255".

Color reproduction equipment takes advantage of the principle that the vast majority of colors can be separated into a specific linear combination of four primary subtractive colors (cyan, yellow, magenta and black—C, Y, M and K) in which the amount of each primary color is set to a predetermined amount. In the case of printed reproductions of an image, use of primary color printing obviates the need to use a differently colored ink for each different color in the image. As such, each image is converted into a succession of three or four color separations, in which each separation is essentially a negative (or positive) transparency with an altered tone reproducing characteristic that carries the color information for only one of the primary colors.

Modern offset printing presses do not possess the capability of applying differential amounts of ink to any location in an image being printed. Rather, these presses are only designed to either apply or not apply a single amount of ink to any given location on a page. Therefore, an offset printing press is unable to directly print a contone separation. To successfully circumvent this problem, halftone separations are used instead. An image formed from any single color halftone separation encodes the density information inherent in a color image from amplitude modulated form into a spatial (area) modulated form, in terms of dot size, which is subsequently integrated by the human eye into a desired color. By smoothly changing halftone dot sizes (dot areas), smooth corresponding tone variations will be generated in the reproduced image. Given this, the art has taught for some time that a full color image can be formed by properly overlaying single color halftone reproductions for all of the primary subtractive colors, where each reproduction is formed from a halftone dot separation that contains dots of appropriate sizes and in one of these primary colors. Clearly, as size of the dots decreases, an increasing amount of detail can be encoded in a dot pattern and hence in the reproduced image. For that reason, in graphic arts applications, a halftone separation utilizes very small dots to yield a relatively high dot pitch (resolution).

With this in mind, one might first think that printing a color image for graphic arts use should be a fairly simple process. Specifically, a color image could first be converted into corresponding continuous tone separations. Each of these contone separations could then be converted into a corresponding halftone separation. A printing plate could then be manufactured from each halftone separation and subsequently mounted to a printing press. Thereafter, paper or other similar media could be run through the press in such a fashion so as to produce properly registered superimposed halftone images for all the subtractive primary colors thereby generating a full color reproduction of the original image.

In practice, accurately printing a color image is oftentimes a very tedious, problematic and time consuming manual process that requires a substantial level of skill. First, the conventional manual photographic process of converting a contone separation into a halftone separation, this process commonly being referred to as "screening", is a time and resource consuming process in and of itself. Second, various phenomena, each of which disadvantageously degrades an image, often occur in a reproduced halftone color image. Moreover, the complete extent to which each of these phenomena is present in the reproduced image is often known only at a rather late point in the printing process thereby necessitating the use of tedious and time and resource consuming iterative trial and error experimentation to adequately eliminate these phenomena.

Specifically, to verify the accuracy of the color printing process and to enable appropriate adjustments to be made at various stages in the printing process in order to correct image defects and improve reproduction accuracy, a test image, frequently referred to as a "proof" is generated from the halftone separations once they are made. After a proof is generated, it is presented as being representative of the reproduced image which will be produced by a printing press in order to determine the accuracy of the printed image. Oftentimes, the proof contains unexpected and unsightly Moire patterns that arise from the interaction of pattern(s) in the image itself with that introduced by use of angled halftone screens that are used to photographically generate the halftone separations. Frequently, these Moire patterns can be rendered invisible by rotation of one or more of the screens to a different screen angle. Unfortunately, the exact change in the screen angle is frequently very hard to discern from the resulting Moire pattern itself and instead must be determined through trial and error experimentation. Unexpected artifacts can also exist in the proof thereby necessitating that various changes must be made to one or more of the separations. As such, this requires that a one or more new halftone separations must be generated or at least changed, a new proof must be produced and then analyzed, with this "proofing" process being iteratively repeated until the objectionable Moire patterns and all objectionable artifacts are eliminated from the proof. Now, once an acceptable proof is made thereby indicating that a printed image based on the separations will likely present a desired depiction of the original artwork, a separate printing plate is then made for each halftone separation. At this point, a full color print, commonly referred to as a "press sheet", is produced from these plates onto a sheet of actual paper stock that is to be used to carry the reproduced image. The press sheet is then examined to discern all imperfections that exist in the image reproduced therein. Owing to, e.g., unexpected dot gain, the existence of any artifacts in the press sheet and tone variations occurring between the press sheet and the desired image of the original artwork, further adjustments in the coloration or screen angle of the separations may need to be made with the entire process, i.e. generation or modification of halftone separations and printing plates, being repeated until an acceptable press sheet is produced. With experience gained over several years, a skilled color technician can reduce the number of times that this entire process needs to be repeated in order to produce a set of color halftone separations that yields an acceptable press sheet.

As one can now readily appreciate, the iterative manual process of producing an acceptable set of halftone separations, due to the inherent variability of the process, can be very tedious and inordinately time consuming. Unfortunately, in the graphic arts industry, publication deadlines are often extremely tight and afford very little, if any, leeway. Consequently, the available time in a graphic arts production environment allotted to a color technician to generate a set of halftone separations to meet a particular publication deadline, for example, is often insufficient to allow the technician adequate time, due to the trial and error nature of iterative process, to generate that set of separations which produces a very high quality halftone color image. As such, the technician is often constrained by time pressures to produce a set of separations that produces a visually acceptable and hence satisfactory, though not necessarily a very high quality, image.

In addition, the manual process can be disadvantageously quite expensive. Inasmuch as the manual process, even for a skilled color technician, involves a certain amount of trial and error experimentation, a number of separate proofs is often made with changed or new separations being generated as a result. Each new separation requires another piece of film. Film and associated developing chemicals are expensive. In addition, if an unacceptable press sheet is produced, then additional separations may need to be made along with new printing plates, which further lengthens the process and increases its expense.

In an effort to reduce the time required and expense associated with conventional manual photographic based color reproduction processes, the art has turned away from use of these manual processes in high volume graphic art applications to the use of intermediate off-press proofing technologies, such as electro-photographic techniques. In this regard, U.S. Pat. No. 4,708,459 (issued to C. Cowan et al on Nov. 24, 1987, assigned to the present assignee hereof and hereinafter referred to as the U.S. Pat. No. '459 to Cowan et al) discloses an electro-photographic color proofing system. While this system generally produces an excellent quality proof, it does not permit a user to precisely specify a dot gain curve shape which, in turn, restricts the ability of this system to provide accurate tone reproduction over the entire operating space of the system.

Specifically, tone reproduction, as it relates to a digital separation, essentially defines an input/output relationship between measured optical reflection densities and corresponding, e.g. eight-bit, contone values. To provide accurate tone reproduction, the measured densities should properly track the contone values. Each contone value represents a corresponding area of a halftone dot. As will be seen, tone reproduction entails consideration of two phenomena: dot gain and solid area density.

As to dot gain, it has been known in the art for quite some time that the effective area of a halftone dot, as printed and as perceived by a viewer, frequently diverges from that of its associated contone value. This is generally caused by a number of factors, some of which are strictly physical in nature, such as for example media absorbency and ink spreading, while others are optical in nature, such as an amount of light that is reflected from or absorbed into a dot. As the actual dot areas that form an image diverge from the corresponding contone values these areas are intended to depict, that image exhibits increasingly poor tone reproduction. For ease of reference and convenience, optical reflectance densities for halftone images are generally viewed, in the art, in terms of equivalent halftone dot areas which permits tone reproduction to be considered in terms of dot gain.

Dot gain, as that term is known in the art, is simply defined as the difference, expressed as a percent and referenced to a full sized (100%) halftone dot, between the size of an output halftone dot (i.e. "dot out") that is produced for a given sized input halftone dot (i.e. "dot in"), specifically dot gain=dot out−dot in. When graphically depicted over a full range of input dot areas, i.e. from 0–100%, output dot area typically does not equal input dot area on a 1:1 basis. While 0% and 100% sized input dots must correspondingly produce 0% and 100% output dots, i.e. zero dot gain must occur at both of these limit points, dot gain is frequently non-zero and positive between these limits thereby defining a non-zero dot gain curve. If output dot area were to equal input dot area on a 1:1 basis throughout the entire range, then this would define a a 45° line (for null dot gain) that emanates from an origin on a dot in vs. dot out curve. Corresponding numerical values for dot gain are frequently specified at 25%, 50% and 75% sized input dots, and occasionally for input dots sized at 90% (for shadow areas) and 10% (for highlight areas). A simple dot gain curve may take the shape of an inverted parabola that has zero dot gain for a 0% input dot, increases on a non-linear basis through 10% and 25%, reaches a maximum at 50%, and thereafter non-linearly decreases through 75% and 90% and finally once again reaches zero at a 100% input dot. The shape of the dot gain curve for any halftone separation effectively provides the shape of the tone reproduction curve of that separation.

Solid area density, frequently stated as $D_{max}$, simply defines the optical reflection density of a solid area that is to be produced by a halftone separation for the maximum contone value associated therewith, e.g. "255" for eight-bit contone values. The value of $D_{max}$ effectively scales the tone reproduction curve of the image formed by that particular separation.

It has been known for some time in the art, that maximum solid area density and dot size are physically linked. In this regard, even as the physical area (i.e. the actual coverage) of a halftone dot remains constant, the apparent size of this dot (i.e. that perceived by a viewer and owing to the optical effects of light reflectance and absorbance between the dot and the media on which that dot is printed) varies with changes in solid area density. Furthermore, the optical effects of dot gain will often be exacerbated by various physical effects, such as media absorbency or ink spreading as noted above, that are associated with actually printing these dots. Specifically, by virtue of these physical effects, a larger or smaller dot may actually be printed than that which was intended.

With the above in mind, if a color proof image is to match the tone reproduction inherent in a press sheet, then that proof image needs to accurately reproduce both a desired solid area density and the dot gain curve shape that are expected to result in the press sheet for each primary color separation in the proof.

To effectuate some control over tone reproduction, the electro-photographic proofing system described in the U.S. Pat. No. '459 to Cowan et al only permits an operator to specifically vary dot size of the halftone dots at a 50% input dot size for any separation. However, this system does not permit the operator to precisely specify a desired dot gain curve shape to be used to generate a primary color halftone image from that separation. By only providing such dot size control, this system in effect merely allows an operator to select any one dot gain curve from a family of pre-defined and similarly shaped dot gain curves that only vary amongst each other by scale. However, mere selection among a family of pre-defined dot gain curves oftentimes does not result in a proper dot gain curve shape that accurately reflects the dot gain inherent in a color printing process which the proof image is to represent. Consequently, the proof will not accurately exhibit the dot gain curve shape inherent in that process. As such, the very limited control over dot gain provided by electro-photographic proofing systems has tended to unduly limit the tone reproduction capability of these systems and hence has often prevented these systems from accurately reproducing various subtleties in a color proof image that would appear in a press sheet.

For a variety of reasons, such as for example, increased flexibility, control and throughput over that provided by optical (including electro-photographic) proofing systems, the art is currently turning towards the use of so-called direct digital color proofing (DDCP) systems. These systems directly generate a halftone color proof image from a set of digitized contone separations and particularly the digitized contone values therefor. Specifically, DDCP systems manipulate the separations in digital form to electronically generate appropriate halftone separations, including, inter alia, electronic screening and dot gain compensation, and then directly write the proof image using an appropriate high resolution binary marking engine. Furthermore, inasmuch as these systems completely eliminate photographic film based processes, these systems are expected to be very economical to operate.

By virtue of providing dot gain compensation in a completely digital fashion, it is expected that these systems will permit far better control over image subtleties and hence tone reproduction than that available through optical proofing systems known in the art. Nevertheless, the art has simply not progressed to the point of providing the capability in a DDCP system of allowing an operator to completely specify and readily change, when required, a desired dot gain curve shape that, within the physical limits of the system, is to be reproduced in the proof and then have the system produce a proof image that exhibits that desired dot gain curve shape. I expect that, by providing this capability, very accurate tone reproduction in a digital proof image will result.

Therefore, a need presently exists in the art for a technique, specifically intended for inclusion in a DDCP system, that can be used to very accurately control the tone reproduction characteristics of the proof image by first permitting an operator to completely specify not only the solid area density but also a desired dot gain curve shape that is to be reproduced in the proof and then producing the proof image to contain that desired dot gain curve shape. By satisfying this need, a proof image will result such that the resulting image will very closely depict the desired image.

DISCLOSURE OF THE INVENTION

Accordingly, an object of the present invention is to provide a technique, specifically apparatus and associated methods, for use in illustratively a direct digital color proofing (DDCP) system, for accurately controlling the tone reproduction characteristics of a proof image.

A specific object is to provide such a technique that permits an operator of such a DDCP system to accurately specify not only solid area density but also a desired dot gain curve shape for use in generating the proof image and to readily change that shape, whenever needed.

Another specific object is to provide a technique that not only permits the desired dot gain curve shape to be specified but also generates, through a screening process and a marking engine, a proof image that exhibits the desired dot gain curve shape.

These and other objects are accomplished in accordance with the teachings of my present invention by, in essence, printing whatever sized output dot is needed at each location in the image, e.g. an image formed of a halftone separation in a halftone color proof, to provide, through a DDCP imaging chain operating at a given condition, a value of density that substantially matches the desired density which is to appear at that location. Since a DDCP imaging chain,—here specifically formed of illustratively a raster image processor (RIP), which implements a screening process, and a marking engine connected thereto (which, for simplicity, are collectively referred hereinafter as a "RIP/marking engine" imaging chain)—has a non-ideal native dot gain characteristic, the area of the output dot that is printed in the proof image, for any input dot area within the range of 0–100%, will generally not equal the area of the corresponding input dot therefor. As such, through the present invention, the value of each incoming continuous tone (contone) value is intentionally varied, in an amount consistent with both the dot gain characteristic of the DDCP imaging chain (i.e., the "Process" dot gain) and a desired (i.e. "Aim") dot gain curve, to yield an output dot, of an appropriate area, that provides the desired density in the proof image. To readily accomplish this, all the incoming contone values are appropriately modified, through illustratively a table look-up operation, into corresponding modified values which, when subsequently rendered into halftone bit patterns by the screening process and then printed on the proof image by the marking engine in the DDCP imaging chain, cause the proof to accurately exhibit the desired "Aim" dot gain curve. This look-up table contains values which represent the "Aim" curve modified by the inverse of the "Process" curve.

Specifically, values for both the "Aim" curve and the "Process" curve, in terms of output dot area, are first obtained. The "Aim" curve specifies the tone reproduction characteristic (here in terms of output dot area vs. input dot area) inherent in a desired printing process and hence that which a proof image is to accurately exhibit. As to the "Aim" curve itself, desired output dot area or density values are first obtained for at least three user defined input dot areas. Illustratively, these input dot areas may be 25%, 50% and 75% dot area. If desired density values are provided by a user, these values are then converted into equivalent dot areas. The desired output values can originate through illustratively user input, optical densitometric measurements of, for example, a press sheet, or by reading and/or modifying an existing data file of "Aim" values. "Process" values are similarly obtained and characterize the operation of the DDCP imaging chain at a desired operating condition, i.e. a given screen ruling, font shape (e.g. square, round, elliptical or diamond), solid area density and separation color (cyan, magenta, yellow or black—C, Y, M or K). These "Process" values, specifically generated through printing a test pattern generally using a null dot gain curve, specify the inherent native dot gain produced by this imaging chain at that operating condition. The "Process" values, again typically specified for a relatively small number of input dot areas, are obtained through densitometric measurement or user input, or by reading and/or modifying an existing data file of "Process" values. Once both these "Aim" and "Process" values (which, for ease of reference and to distinguish these values from other dot area values, are referred to as "setpoints") are obtained, these setpoints are then interpolated to determine, at 12-bit resolution, output dot area values that exist for "all possible" "Aim" or "Process" input dot area values, which for 8-bit contone values corresponds to 256 successive incremental input dot areas that span the complete range of 0-100% dot area. To provide accurate interpolation, coefficients of illustratively a monotone piecewise cubic function that spans each pair of adjacent "Aim" or "Process" setpoints are first determined. This ensures that all the setpoints for each of the "Aim" and "Process" data are smoothly joined by the monotonic interpolant functions. Then, once the coefficients have been determined for every pair of "Aim" or "Process" setpoints, the interpolant function associated with that pair is evaluated for each of the "all possible" input dot area values which lie on the end of or within the interval which spans that pair of setpoints. Two lists of illustratively 256 12-bit interpolated values result: one list of interpolated "Aim" values and an associated list of interpolated "Process" values. These lists are then stored in separate data files along with appropriate "set-up" information which defines the specific operating condition under which the values in each list are associated.

Thereafter, a customized dot gain look-up table is constructed from the "Aim" and "Process" lists for a common operating condition. In particular, for each value in the "Aim" list, the index of the numerically closest value in the "Process" list is determined. This index value specifies the associated input dot area, scaled in terms of, e.g. the values "0" to "255" for 0-100% dot area, that the marking engine requires to produce a dot having an effective dot area that is the closest match to the effective dot area specified by that particular "Aim" value. The value of that index is then stored in a look-up table at the location defined by the index of the "Aim" value. The result is a table of indices which reflect the desired dot gain modified by the inverse of the native dot gain characteristic of the DDCP imaging chain at that operating condition. Thereafter, to generate a proof image at that condition and exhibiting a desired dot gain curve, all the incoming contone values associated therewith are first routed through the look-up table to yield resulting index values which are then rendered into corresponding halftone bit patterns and thereafter applied to the marking engine. The incoming contone values, after modification by the look-up table, will all have a component derived from the inverse of the native dot gain characteristic of the RIP/-marking engine imaging chain and thereby cause that chain to produce a proof image that exhibits the desired "Aim" dot gain without substantially any corruption, if at all, from the native dot gain characteristic of this imaging chain. By merely changing the contents of the look-up table by processing other lists of corresponding interpolated "Process" and/or desired "Aim" data, for a common operating condition, and constructing a table therefrom, the DDCP imaging chain can produce a proof image that, within physical limits occurring at that operating condition, will accurately exhibit nearly any desired "Aim" curve and hence depict the desired tone reproduction characteristic associated therewith.

Although solid area density and dot gain are related, my invention possesses the advantageous feature of effectively de-coupling these factors such that a user can separately specify a desired "Aim" dot gain curve shape and a desired solid area density for each separation in a proof image. Not only does this simplify the information that the user is required to provide to a DDCP system to print each such separation but also this provides increased flexibility to the user in specifying which particular factor is to be changed.

BRIEF DESCRIPTION OF THE DRAWINGS

The teachings of the present invention may be readily understood by considering the following detailed description in conjunction with the accompanying drawings, in which:

FIG. 2 depicts the correct alignment of the drawing sheets for FIGS. 2A and 2B;

FIGS. 2A and 2B collectively depict a high level block diagram of Direct Digital Color Proofing (DDCP) system 100 that embodies the teachings of my present invention;

FIG. 3A depicts the data structure of a proof request;

FIG. 3B depicts the structure of image file description field 310 situated within proof request (queue element) 300 shown in FIG. 3A;

FIG. 3C depicts image processing flags field 319 that forms part of image file description field 310 shown in FIG. 3A;

FIG. 3D depicts the structure of each one of pass parameter fields 380 situated within proof request 300 shown in FIG. 3A;

FIG. 4A depicts a high level block diagram of a process which is performed within operator PC (personal computer) 120 shown in FIGS. 2A and 2B for generating a customized dot gain look-up table in accordance with the teachings of my present invention;

FIG. 7 depicts a high level flowchart of process 700 for manipulating "Aim" and "Process" data in accordance with my inventive teachings;

FIG. 8 depicts a high level flowchart of process 800 for creating a customized dot gain look-up table in accordance with my inventive teachings and based upon interpolated "Aim" and "Process" values produced through process 700 shown in FIG. 7;

FIG. 9 depicts a flowchart of process 900 for downloading a customized dot gain look-up table created by process 800 into RIP processor 230 in DDCP system 100 shown in FIGS. 2A and 2B;

FIG. 10 depicts a flowchart of Dot Manager Main Routine 1000 for implementing a preferred embodiment of my present invention;

To facilitate understanding, identical reference numerals have been used, where possible, to denote identical elements that are common to various figures.

MODES OF CARRYING OUT THE INVENTION

Figure 1A:
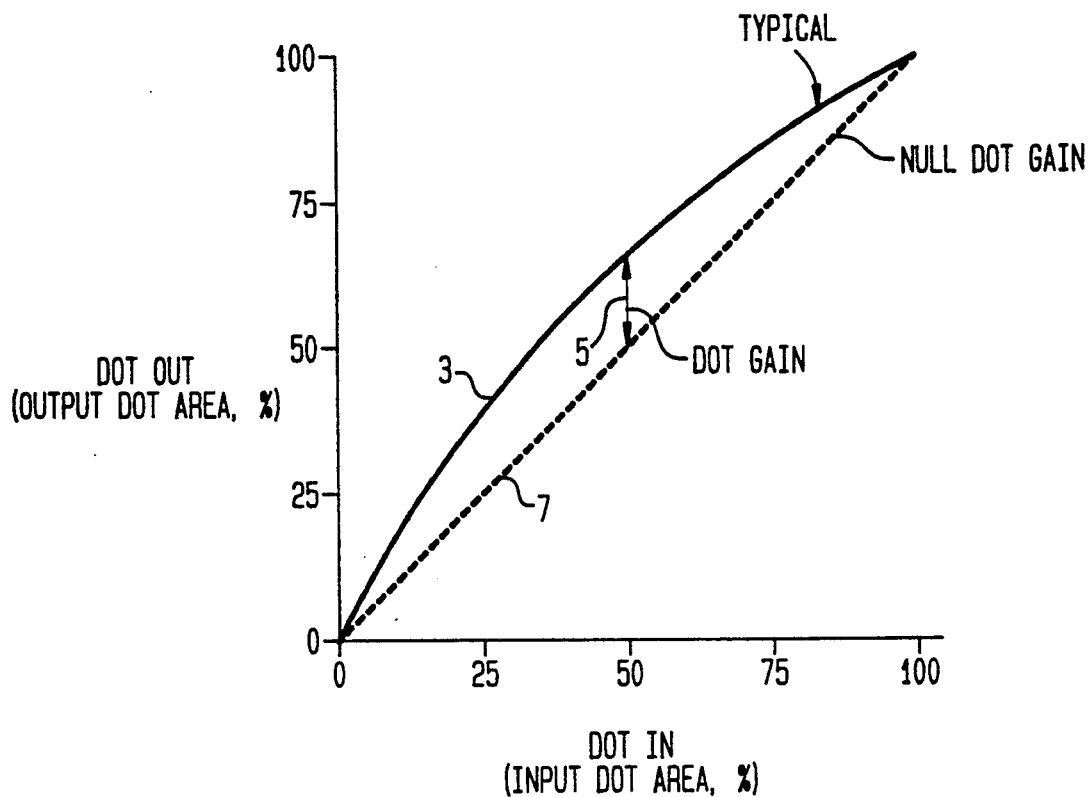
FIG. 1A graphically depicts typical dot in - dot out curve 3 and curve 7 having null dot gain as they are known in the art.

After reading the following description, those skilled in the art will readily appreciate that my present invention can be used in a wide variety of different imaging applications to produce, through an imaging process, an output image that exhibits a desired tone reproduction, such as dot gain, characteristic and is substantially free of any corruption due to a native tone reproduction characteristic of that process. Such an image may illustratively include color halftone images, four-bit black and white images, or eight-bit contone images, or even video images. Inasmuch as my present invention is particularly (though by no means exclusively) suited for use in a direct digital color proofing (DDCP) system with a DDCP imaging chain formed of a screening process, which is illustratively provided through a raster image processor (RIP), and a binary marking engine used to generate a color proof image formed of properly superimposed images of cyan, magenta, yellow and black (C, Y, M and K) halftone separations in which each separation is to exhibit a desired dot gain curve and hence a desired tone reproduction characteristic, then, to simplify the following discussion, the invention will be specifically discussed in that context.

Tone reproduction, as it relates to a digital separation, essentially defines an input/output relationship between measured optical reflection densities and corresponding, e.g. eight-bit, continuous tone ("contone") values. Ideally, to provide accurate tone reproduction, the measured densities should properly track the contone values. Each contone value represents a corresponding area of a halftone dot. Tone reproduction entails consideration of two phenomena: dot gain and solid area density.

As to dot gain, the area of a halftone dot, as printed and as perceived by a viewer, frequently diverges from its associated contone value, as shown by curve 3. For purposes of this invention, input dot area is defined to be an equivalent area that is proportional to a digitized value in a contone image file. For an 8-bit (i.e. "0" to "255") digitized positive image, the equivalent input dot area is typically defined by equation (1) as follows:

$$\% \text{ Dot Area} = 100\% \frac{CTV}{255} \qquad (1)$$

where: CTV is a digitized contone value.

The divergence between corresponding input and output dot areas is generally caused by a number of factors, some of which are strictly physical in nature, such as for example media absorbency and ink spreading, while others are optical in nature, such as an amount of light that is reflected from or absorbed into a dot. As the actual dot areas that form an image diverge from the corresponding contone values these areas are intended to depict, that image exhibits increasingly poor tone reproduction. For ease of reference and convenience, optical reflectance densities for halftone images are generally viewed in terms of equivalent halftone dot areas which permits tone reproduction to be considered in terms of dot gain.

Dot gain is simply defined as the difference, illustratively shown by distance 5, expressed as a percent and referenced to a full sized (100%) halftone dot, between the size of an output halftone dot (i.e. "dot out") that is produced for a given sized input halftone dot (i.e. "dot in"), specifically dot gain=dot out−dot in. If output dot area were to equal input dot area on a 1:1 basis throughout an entire range of 0–100% input dot area, then this would define 45° line 7, as shown in FIG. 1A, that emanates from an origin on a dot in vs. dot out curve. Such a line defines a so-called null dot gain curve. While 0% and 100% sized input dots must correspondingly produce 0% and 100% output dots, i.e. zero dot gain must occur at both of these limit points, dot gain is frequently non-zero and positive between these limits thereby defining a non-zero dot gain curve, such as curve 3. Corresponding numerical values for dot gain are frequently specified at 25%, 50% and 75% sized input dots, and occasionally for input dots sized at 90% (for shadow areas) and 10% (for highlight areas).

Figure 1B:
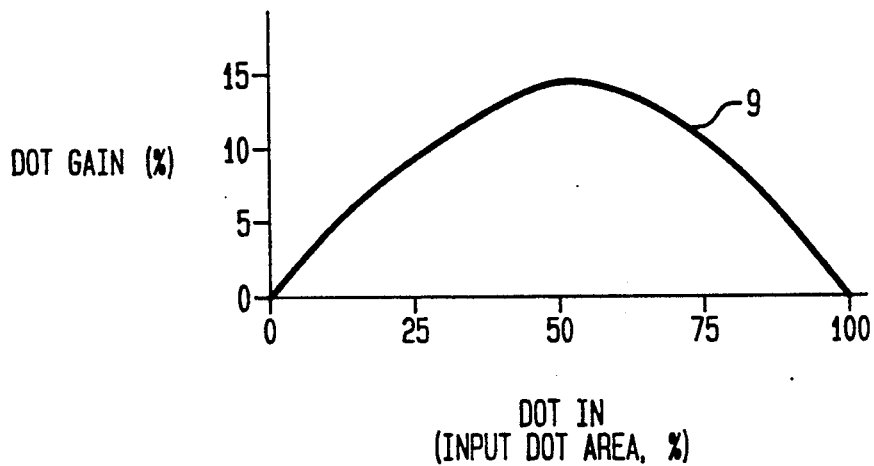
FIG. 1B graphically depicts dot gain curve 9 associated with dot in - dot out curve 3 shown in FIG. 1A.

FIG. 1B graphically depicts dot gain curve 9 associated with dot in - dot out curve 3 shown in FIG. 1A. As such, curve 9 has the shape of illustratively an inverted parabola that has zero dot gain for a 0% input dot, increases on a non-linear basis through 10% and 25%, reaches a maximum at 50%, and thereafter non-linearly decreases through 75% and 90% and finally once again reaches zero at a 100% input dot. The shape of the dot gain curve for any halftone separation effectively provides the shape of the tone reproduction curve of that separation.

Color halftone reproduction equipment, specifically a raster image processor (RIP) and a marking engine connected thereto which collectively form a DDCP imaging chain (also hereinafter referred to as a "RIP/marking engine imaging chain") used in a DDCP system, possesses a native non-zero dot gain characteristic which oftentimes varies based upon the operating condition at which that equipment is operated. These variations are attributable to changes in, for example: solid area density, screen ruling, color (C, M, Y or K) being written, and dot font shape used (square, round, elliptical or diamond), the last effect being particularly noticeable at approximately 50% dot areas, as well as to changes in media and other physical factors. As a result of this variable native dot gain characteristic, if an image of a halftone separation were to be written by a DDCP system without consideration of the native dot gain characteristic of the DDCP imaging chain, particularly at the desired operating condition, the dot gain inherent in the resulting image would be corrupted by the native dot gain characteristic of this chain. As such, a resulting proof image would not accurately depict the dot gain inherent in the reproduction equipment and hence would not accurately represent a resulting press sheet to be formed thereby.

However, through use of my invention, resulting halftone dots will be produced in corresponding locations in an image formed from a halftone color separation by a DDCP imaging chain (here formed illustratively of a raster image processor, which implements a screening process, and a marking engine—which, for simplicity, are hereinafter collectively referred to as a "RIP/marking engine" imaging chain) that, when printed at a given operating condition, will advantageously provide a corresponding density value that will accurately match the density value which is to appear at each of these locations. Specifically, the value of each input dot area (i.e. incoming contone value) is intentionally varied, in an amount consistent with both the dot gain characteristic of the DDCP imaging chain (i.e., the "Process" dot gain) and a desired (i.e. "Aim") dot gain curve, to yield a resulting contone value (i.e. an output dot area value) that, when subsequently printed by the marking engine, provides the desired density in the proof image. To readily accomplish this, all the incoming contone values are appropriately modified, through illustratively a table look-up operation, into corresponding modified contone values which, when subsequently applied, by way of the RIP, to the marking engine and printed on the proof image, cause the proof to accurately exhibit the desired "Aim" dot gain curve.

Specifically, in accordance with my inventive teachings, monotonically interpolated, e.g. using monotone piecewise cubic interpolation, "Aim" and "Process" data for "all possible" inputs are determined from corresponding input "Aim" and "Process" data and then combined to yield a customized dot gain look-up table that, for a given condition at which the DDCP imaging chain is to run, reflects the "Aim" data modified by the inverse of the "Process" data, i.e. the latter reflecting the native dot gain characteristic of the DDCP imaging chain which occurs at that condition. By obtaining and then interpolating appropriate "Process" and/or desired "Aim" data, for a common operating condition and then constructing a look-up table therefrom, the DDCP imaging chain can produce a proof image that, within physical limits occurring at that operating condition, will accurately exhibit only the desired "Aim" dot gain curve and hence the desired tone reproduction characteristic associated therewith. Advantageously, only the look-up table needs to be changed in the event the operating condition changes or if the desired "Aim" dot gain curve changes in order to subsequently generate a proof image that will accurately exhibit a desired "Aim" dot gain curve.

Figure 2B:
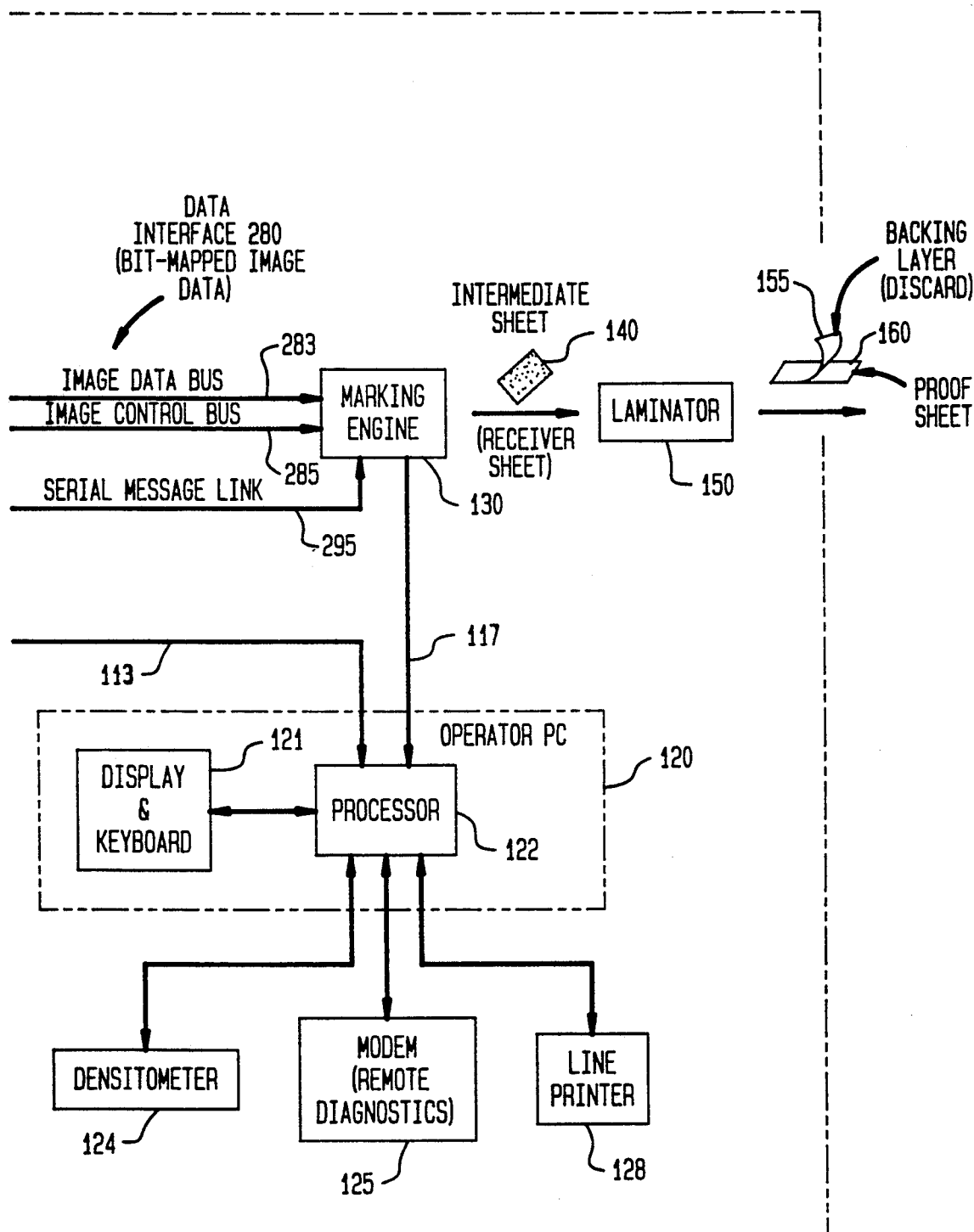

FIGS. 2A and 2B collectively depict a high level block diagram of DDCP system 100 that incorporates the teachings of my present invention; the correct alignment of the drawing sheets for these figures is depicted in FIG. 2.

Specifically, as shown, DDCP system 100 is connected to and obtains continuous tone image data, via lines 105 (containing lines $105_1$, $105_2$, ..., $105_n$), for an image from any one of a number of color electronic pre-press systems (CEPSs) $103_1$, $103_2$, ..., $103_n$ that collectively form CEPSs 103. In essence, DDCP system 100 processes the contone image data for each image and generates an accompanying color proof image therefor on, for example, a paper medium. The resulting proof image after being transferred to the paper medium is referred to as a "proof sheet". Continuous tone image data can also be previously recorded on magnetic tape and, through magnetic tape drive 107 and lead 106, provided to DDCP system 100 for proofing.

The data provided by each CEPS is in the form of a file of successive contone values which, for each successive pixel within an image, are formed of interleaved contone values for the individual separation colors, e.g. values for cyan, yellow, magenta, and black (C, Y, M and K), therefor. Each of CEPSs 103 can be any one of a number of current commercially available color electronic pre-press systems.

For any image to be proofed, DDCP system 100 digitally manipulates the contone separation values provided by any of the CEPSs by first de-interleaving these values into individual contone separation files, then digitally generates a halftone separation file for each of the individual contone separations by, for example, inter alia, electronic screening and dot gain compensation, and then directly writes a composite color proof image for all these halftone separations using an appropriate marking engine.

DDCP system 100 contains raster image processor (RIP) 200; marking engine 130; operator personal computer (PC) 120 and its associated peripherals: densitometer 124, remote diagnostics modem 125 and line printer 128; and laminator 150. Each of CEPSs $103_1$, $103_2$, ..., $103_n$ is connected within RIP 200 through an appropriate hardware interface $212_1$, $212_2$, ..., $212_n$, which collectively form interfaces 212, to CEPS bus 215 which, in turn, is connected to processor 230. This processor is a conventional microcomputer system. Hard disks 240 and 250 (also denoted as hard drives 1 and 2) are also connected to processor 230 and provide temporary storage of processed halftone image data generated by this processor. Each of these hard disks contains an image file, with both of these files collectively operating, as discussed in detail below, on a "ping-pong" basis such that processor 230 writes halftone image data for the next image to be proofed into one of these files, while it reads halftone image data for the current image being proofed from the other file and applies that data to the marking engine. The processor alternates the function of each of these files between reading and writing as data for successive images to be proofed is applied to the DDCP system.

RIP 200 is connected to marking engine 130 through serial message link 295 which carries status and error messages, commands and parameters between these units on a serial basis. Data interface 280, which is formed of sixteen-bit parallel (active high) image data bus 283 and image control bus 285, is used to transfer halftone image data in sixteen-bit parallel form (for transferring halftone data for sixteen successive pixels at a time) from the RIP to the marking engine. The RIP pads, as necessary, each micro-raster of the image to a sixteen-bit word boundary and, prior to the transfer of data across data bus 283, notifies the marking engine, via serial link 295, as to the number of halftone bytes existing on each line of the proof image. This number is a constant for each image. Image control bus 285 contains three separate lines (not specifically shown): data ready, data request and data acknowledge, which are collectively used by RIP 200 and marking engine 130 to implement a simple interlocked handshake protocol to transfer each successive sixteen-bit data word between these components. In particular, to transfer a sixteen-bit data word, RIP 200 asserts a signal (active low) on the data ready line (the "data ready signal") to inform the marking engine that data transfer is to begin. Thereafter, to obtain this data word, the marking engine asserts a signal (active low) on the data request line (the "data request signal"). Once this latter assertion is detected by the RIP, the RIP places the sixteen-bit data word onto image data bus 283 and then asserts a signal (also active low) on the data acknowledge line (the "data acknowledge signal"). Once the marking engine reads this data word and then, in response to the asserted data acknowledge signal, the engine de-asserts the data request signal. In response to this, the RIP de-asserts the data acknowledge signal thereby completing an interlocked handshake operation and the accompanying successful data transfer. On the rising edge of the data acknowledge signal, the marking engine loads the incoming sixteen-bit data value into an internal holding first-in first-out (FIFO) circuit (not shown). These steps are then repeated in seriatim for each successive sixteen-bit data word that is to be transferred from RIP 200 to the marking engine for the current image to be printed. After all the halftone data has been transferred for a given proof image, the RIP will de-assert the data ready line. For each proof that is to be printed, the RIP successively transfers to the marking engine the complete bit-mapped halftone image data, as a succession of sixteen-bit words, for each separate halftone separation image that is to form the proof.

Operator PC 120, containing display and keyboard 121 and processor 122, is a conventional personal computer that is interfaced through links 113 and 117 to both RIP 200, specifically processor 230 therein, and marking engine 130. This PC permits a DDCP system operator to, inter alia, produce and download a customized dot gain table into the RIP, monitor and interrogate the status of as well as control both RIP 200 and marking engine 130 and perform diagnostic and set-up operations thereon, as desired. Densitometer 124, under control of operator PC 120, is used to measure the density of various test patches generated by the RIP/marking engine imaging chain in order to calibrate its performance and/or to produce a source of "Process" data, and/or to measure such densities associated with a desired image to provide the "Aim" data. Modem 125 provides a dial-up telephone link for use in remotely diagnosing any abnormalities that may occur within the DDCP system. Line printer 128 can be used by the DDCP system operator to provide a local printout of desired information.

Marking engine 130 is preferably a multi-laser sublimation dye transfer binary marking engine. In essence, to print a proof image by the marking engine, a receiver sheet (i.e. a film media with a transfer layer) of appropriate dimensions is automatically cut and wrapped onto a rotating drum (not shown) within the engine. Thereafter, to generate a particular C, Y, M or K separation, a respective C, Y, M or K dye donor sheet is first spooled off a supply reel within the engine and superimposed, in proper registration, onto the receiver sheet with an emulsion side of the donor sheet contacting the receiver sheet. Thereafter, a bit-mapped image for an appropriate halftone separation is written by the marking engine onto the donor sheet by selectively exposing that sheet, using a writing laser, at each location where a writing spot is to appear. At each such location, the exposure causes a controlled amount of dye to migrate (transfer) from the donor sheet to the top of the transfer layer of the receiver sheet. For each writing spot, the intensity of the light produced by the writing laser determines the amount of dye that transfers to the receiver sheet. The donor sheet is then removed from the receiver sheet. This process is then repeated using a differently colored donor sheet in conjunction with the same receiver sheet for each remaining separation. In addition, the marking engine can accommodate differently colored receiver sheets. Furthermore, the marking engine can also accommodate two specially colored donor sheets and write accompanying separations thereon for transfer to a receiver sheet. The special colors and accompanying separations are used to generate an exact shade of either of two desired colors, such as "KODAK" yellow, or of colors that are not within the color gamut defined by cyan, yellow, magenta and black, e.g. "Hot" pink, phosphorescent, pastels or gold colors. ("KODAK" and the specific color "KODAK yellow" are both registered trademarks of the Eastman Kodak Company of Rochester, N.Y. which is also the present assignee hereof.) Once marking engine 130 writes all the separations for a particular proof image onto a common receiver sheet, the engine ejects that sheet as intermediate sheet 140. At this point, the entire proof image is situated on the top of the transfer layer of the receiver sheet that forms intermediate sheet 140. In order to transfer the proof image from the intermediate sheet to paper media, in order to form a so-called "proof sheet", the DDCP system operator manually inserts intermediate sheet 140 along with a sheet of prelaminate material and a sheet of press stock into laminator 150. Laminator 150 is not electrically connected to any of the components within DDCP system 100. Once the operator feeds these sheets into the laminator, it first prelaminates the press stock to the intermediate sheet and then laminates the transfer layer to the press stock. Once lamination is completed, a laminated page emerges from the laminator with the transfer layer containing the proof image fused to the press stock. The operator then peels off and discards intermediate layer 155, which is a backing layer, and then retains proof sheet 160 containing the proof image. For purposes of the present invention, any one of a number of other types of marking engines could also be used. Inasmuch as the marking engine itself and the laminator do not form part of the present invention, they will not be discussed in any further detail below.

In order to generate a proof image, an operator situated at any of CEPSs 103 formulates a proof request through a keyboard and an interactive menu based display provided thereat. The proof request, as defined below and shown in FIGS. 3A-3D, contains those parameter values and file name(s) that are necessary, when proofing resources are available, to set-up the DDCP system to generate a proof image. The parameter values define the manner through which the contone image data for the proof image is to be processed by the RIP, such as by defining screen rulings and angles, separation sequence, number of copies and the like, and then printed by the marking engine. The file name(s), which are defined by the CEPS operator, specify the names of the data file(s) that reside on the CEPS and contain the interleaved contone image data for that proof image. Note however, that the proof request does not however contain the image data itself but only an identification of the file(s) which stores that data. By eliminating image data from each proof request, the size of each proof request is substantially reduced from upwards of approximately 100 MBytes (for image containing both contone data and linework) to approximately 200 bytes.

After a proof request has been entered, the particular CEPS on which it is entered will transmit that request to DDCP system 100 and specifically to RIP 200. Proof requests can be entered either while the DDCP system is currently processing a prior proof request, printing a proof image or performing neither operation. RIP 200 maintains a proof request queue (not specifically shown) within one of the two hard disks, illustratively within hard disk 240. This queue contains three separate queues: a "rush" queue, a "normal" queue and a "hold" queue. Based upon the priority accorded to the request by the operator, i.e. rush, normal or hold, RIP 200 places the incoming request at the bottom of the appropriate queue. Those requests that have been assigned a rush priority are sequentially processed first, again on a first-in first-out basis, by the RIP and, in turn, forwarded to the marking engine for printing ahead of any "normal" priority requests. A request with a "hold" priority is merely retained in the "hold" priority queue but is not processed until such time as its priority is changed or it is incorporated into a "scatter" proof request. A scatter proof is a proof that contains a number of non-overlapping images, here arising from separate proof requests, that are printed on a common proof sheet.

Through operator PC 120 and specifically through interactive menu based screen displays generated thereat, the DDCP system operator can edit the contents of each of the queues and each proof request therein. Because the image parameters that configure the marking engine for any proof image form part of the request for that proof, the operator can change, as desired, the condition(s) under which any individual proof will be generated, e.g. by changing screen angle for any individual halftone separation. In addition, the DDCP system operator can also re-prioritize the proof requests, re-arrange the order in which the proof images are successively generated, and even to add or delete proof requests from each queue.

The RIP begins processing a particular proof request once that request reaches the top of its associated queue. To simplify matters for purposes of the ensuing discussion, the proof request queue will be assumed, on a simplistic basis, as containing only one queue. Specifically, after the most recently occurring request has been fully processed, the RIP reads the next proof request situated at the top of the queue. Once this request has been read, the RIP determines, based upon the parameter values specified in that request and current system resources, whether a proof image for that request can be currently printed or not. In this regard, for example, if the request specifies a particular media color, the RIP determines through querying marking engine 130 whether media for that color has been loaded into the engine and whether sufficient supplies of that media exist to generate the proof. Similarly, if a special color donor sheet is specified, the RIP inquires as to whether that donor sheet is available, and so forth for other consumable items.

If the RIP determines that appropriate system resources exist to generate a proof image for this request, then the RIP obtains the appropriate contone data file(s) from the CEPS that generated this request. The appropriate file name(s) and an identification (device name) of this CEPS are specified within the proof request. For example, for a proof request generated from CEPS $103_2$, RIP 200, as shown in FIGS. 2A and 2B, sends an instruction containing the file name(s) specified in that request for the accompanying contone data to this CEPS. In response, this CEPS reads the file(s) and supplies the data over line $105_2$ to RIP 200. This data will be routed through the appropriate interface circuitry, such as circuitry $212_2$, which provides an appropriate hardware interface for this CEPS to the RIP. The data is then routed, via CEPS bus 215, to processor 230 situated within RIP 200. The processor will first translate this data, if necessary through an appropriate translation routine, into a form compatible with RIP programming. This may include, for example, inverting density values where on a particular CEPS a "0" eight-bit contone value may indicate full density, while on the DDCP system the same value would indicate no density. To provide compatibility across many different CEPSs, separate hardware interfaces and software translation routines, to the extent needed, will exist within the RIP for each different CEPS. As such, DDCP system 100 can function with a wide variety and nearly any number of different CEPSs that are interfaced to CEPS bus 215. After the contone data has been appropriately translated and modified for dot gain, RIP 200 will electronically screen the data for that separation to generate a halftone separation for each different color. Thereafter, the RIP will store all the data for the halftone separations for the current image being processed in either hard disks 240 or 250. At the same time, the RIP is reading halftone image data for the image that has most recently been processed and is applying that data over data interface 280 to marking engine 130 to generate a proof image therefor. To increase throughput, the RIP pipelines the image processing and printing functions. Specifically, while processed halftone image data is being read from one hard disk and printed, newly processed image data for the next image to be printed is being stored on the other hard disk. Under the control of RIP 200, each of the hard disks reverses its function with each successive image. Operating the hard disks in this fashion increases the throughput of proof images through the DDCP system and allows the system to produce a relatively steady stream of images at or near the throughput of the marking engine. Therefore, assuming that the RIP is currently reading halftone image data from hard disk 250 for printing, newly processed image data for the current image being processed will be stored on hard disk 240. Once all the data has been supplied from hard disk 250 to marking engine 130 in order to print the most recently processed image, then, shortly thereafter, RIP 200 will read the halftone image data stored on hard disk 240 and supply it to the marking engine for printing, with this process being repeated for successive images to be proofed. For a detailed explanation of the queue based manner in which proof requests are processed through RIP 200, including the use of hard disks operating on a "ping-pong" basis, the reader is referred to the co-pending United States patent application entitled "A Queue Based Technique for Handling Proof Requests in a Direct Digital Color Proofing System" from applicants S. Auer et al, Ser. No. 07/749,024; filed Aug. 23, 1991 and which has been assigned to the present assignee hereof and which is incorporated by reference herein.

The proof requests that reach the top of either of the "rush" or "normal" priority queue but can not be processed by the RIP at the time they were read retain their place in their respective queue pending subsequent processing. Proof requests can also be entered by the DDCP system operator through operator PC 120 and specifically using menu driven interactive screen displays and keyboard entry through display and keyboard 121.

FIG. 3A depicts the data structure of a typical proof request. This request is stored within the proof request queue as proof request (queue element) 300. Request 300 contains a succession of fields, with their accompanying reference numbers, listed and described below in Table 1.

TABLE 1

| Item | Proof Request Fields Description |
|---|---|
| Pointer to next entry (305) | Pointer to next entry (proof request queue element -- PRQE) in a linked list, that forms a queue, |

TABLE 1-continued

| Item | Proof Request Fields Description |
|---|---|
| | (rush, normal or hold) which holds this proof request; |
| Input file description (310) | Data structure which specifies: characteristics of the particular contone data to use in generating a proof image; file, device and page names for this data; and various image processing flags to enable/disable corresponding imaging features; |
| Output color order (325) | String defining the order of cyan, magenta, yellow, black, one film "special" color and/or two additional "special" separation colors for use in up to five successive halftoning passes for a common proof image; |
| Screen ruling (330) | Floating point value between 65-200 lines/inch continuous (approximately 26-79 lines/cm) which specifies the screen ruling to use for all the separations; |
| Dot font (335) | Byte specifying dot font, e.g. diamond, elliptical, square, round, gravure or composed; |
| Description (340) | Optional text for a data legend to be printed on the side of the proof image (string); |
| Number of proof copies (345) | Integer value from 1-50 designating number of copies of a proof image to print (byte); |
| Upper left hand corner x coordinate position (350) | Integer value (in mm) defining the x position of the upper left hand corner of an image to be proofed relative to the media sheet (commonly referred to as Expose Offset w) -- only required for use in a scatter proof request; |
| Upper left hand corner y coordinate position (355) | Integer value (in mm) defining the y position of the upper left hand corner of an image to be proofed relative to the media sheet (commonly referred to as Expose Offset h) -- only required for use in a scatter proof request; |
| Scatter proof enable (360) | Boolean value specifying whether this proof request can be part of a scatter proof request. If this enable is not set, then the associated request will not be included in a scatter proof request regardless of whether the associated request has been given a "hold" priority; |
| Priority (365) | Byte specifying rush, normal or hold; |
| Extra Separation Names (370) | Strings (up to two) which specify the file names of up to two extra (additional) separations that are to be generated for the proof image; |
| Recipe Color Number (375) | Strings (up to two) which specify the number of a special color to be used for printing a halftone separation; and |
| Pass parameters (380) | Data structure specifying parameter values particular to each halftone printing (writing) pass that is to be undertaken by the marking engine. |

As indicated in FIG. 3B, image file description field 310 is itself a data structure that, among other things, contains a succession of names and parameter values pertinent to the particular contone data to use in generating a proof image for this request. Specifically, the constituent fields in field 310 are listed, with their accompanying reference numbers, and described below in Table 2.

TABLE 2

Image File Description Fields

| Item | Description |
| --- | --- |
| CEPS Device Name (311) | String that specifies the name of the CEPS (or other device) on which the contone data file(s) reside; |
| Job Name (312) | String that defines a job name for the current proof request. Fields 311 and 312 are automatically established for this proof request once the CEPS (or DDCP system) operator establishes a pathname at the CEPS (or the Operator PC) for the contone file(s); |
| Page Name (313) | String which identifies the name of the particular page in the artwork to be proofed through this request; |
| Image Name (314) | String which identifies the name of the particular image in an artwork to be proofed through this request; |
| CT resolution (315) | Integer value that specifies the resolution of the contone image file(s) to be proofed through this request; |
| LW resolution (316) | Integer value that specifies the resolution of the accompanying linework (LW) file(s) to be proofed through this request; |
| Image Height (317) | Integer value (in mm) that specifies image height; |
| Image Width (318) | Integer value (in mm) that specifies image width; and |
| Image Processing Flags (319) | Byte containing various boolean flags to control various image processing and printing functions. |

Image processing flags 319, as specifically shown in FIG. 3C, contain separate boolean fields for the functions of, inter alia: image scaling, rotation, mirror orientation, control strip enable and data legend enable. Specifically, the scaling ("Scale to Fit") flag, if set, permits the RIP to scale the size of the image, if needed, to fit the dimensions of a proof image area that has been defined on the media on which the proof will be generated. Similarly, the rotation ("Rotate Image") flag, if set, permits the RIP to rotate the image by 90°, if needed, to fit the proof image area. The mirror ("Mirror Image") flag instructs the marking engine, through the RIP, to change the orientation of the image, in a fast scan direction, based on whether the contone data was stored in a so-called "mirrored" format by a CEPS which generated this request. The control strip enable flag, if set, instructs the RIP to print a control strip on the edge of the proofed image as it is being printed. The control strip consists of a series of single color test patches for use in subsequent densitometric measurements of the proofing process. Lastly, the data legend enable flag, if set, instructs the RIP to print a data legend, as specified in description field 340 shown in FIG. 3A, on the edge of the proofed image as it is being printed.

As indicated in FIG. 3D pass parameters field 380 is itself a data structure that is replicated up to five times and contains parameter values pertinent for each successive halftoning pass that is to be performed by the marking engine to generate a proof image for the associated request. Inasmuch as four separate passes can occur for the four different donor sheet colors and a separate pass can occur for a special colored media sheet, five separate halftoning passes can be specified in a proof request. Although the marking engine can accommodate a different specially colored media as well as a normal media, only one such media can be used generate any one proof image. The order of these passes is that specified in output color order field 325 shown in FIG. 3A. Therefore, the first occurrence of field 380 is for the first halftoning pass specified in output order field 325, the second occurrence of field 380 is for the next successive halftoning pass and so on for each of the remaining passes. Specifically, the constituent fields that form each one of pass parameter fields 380 are listed, with their accompanying reference numbers, and described below in Table 3.

TABLE 3

Pass Parameters Fields

| Item | Description |
| --- | --- |
| Screen angle (381) | Floating point value between ±180° continuous specifying the screen angle for a corresponding pass. |
| Dot gain table (383) | String which identifies a dot gain table to use in this pass. During job entry, as discussed below, RIP processor 230 issues an instruction to operator PC 120, as shown in FIGS. 2A and 2B, to download this dot gain table, in the event it exists, from this PC into this processor. |
| Solid area density (385) | A signed byte between the values ±22 for a halftoning pass for a donor sheet color, or between ±99 for halftoning pass for a special media color. |

Now, with the above in mind, the remaining discussion will specifically address the implementation of a preferred embodiment of my invention within operator PC 120 (located within DDCP system 100 shown in FIGS. 2A and 2B) and particularly the software executing thereon for producing a proof image, through RIP 200 and marking engine 130, that exhibits a desired "Aim" dot gain curve.

Specifically, FIG. 4A depicts a high level block diagram of the inventive process which is performed within operator PC 120 for generating a customized dot gain look-up table. To utilize this process, an "Aim" dot gain curve is first defined, as represented by block 405. The "Aim" curve (typified by the dot gain curves shown in FIG. 5 and discussed below) specifies the tone reproduction quality (here in terms of dot in vs. dot out) inherent in a desired printing process and hence that dot gain which a user wants accurately exhibited in a proof image. As to the "Aim" curve itself, desired output dot area or density values are obtained for at least three user defined input dot areas. Illustratively, these input dot areas may be 25%, 50% and 75% dot area. If density values are provided by a user, these values are then converted, through a well known equation as discussed in detail below, into equivalent dot areas. The desired output values can originate through illustratively user input—as shown, optical densitometric measurements of, for example, a press sheet, or by reading and/or modifying an existing data file of "Aim" values. For ease of reference and to distinguish these values from other dot area values, the specified output "Aim", as well as the "Process", dot area values are hereinafter referred to as "setpoints".

Once the "Aim" setpoints have been specified by whatever method is used, these values are then interpolated within block 405, shown in FIG. 4A, to determine, at a 12-bit resolution (i.e. the values "0" to "4095"), output "Aim" dot area values that exist for "all possible" input dot area values, which for 8-bit contone values correspond to 256 successive incremental input dot areas that span the complete range of 0-100% dot area. To provide accurate interpolation, coefficients of illustratively a monotone piecewise cubic function that spans each pair of adjacent "Aim" setpoints are initially determined. This assures that all the setpoints for each of the "Aim" data are smoothly joined by the monotonic interpolant functions. Once the coefficients have been determined for every pair of adjacent "Aim" setpoints, the interpolant function associated with that pair is evaluated for each of the "all possible" input dot area values which lie on the end of or within the interval which spans that pair of setpoints. This results in a list of 256 12-bit interpolated values. This list is then stored within "Aim" data files 415 in a user specified data file along with appropriate "set-up" information which defines the specific operating condition under which the values in this "Aim" list are associated.

Figure 6:
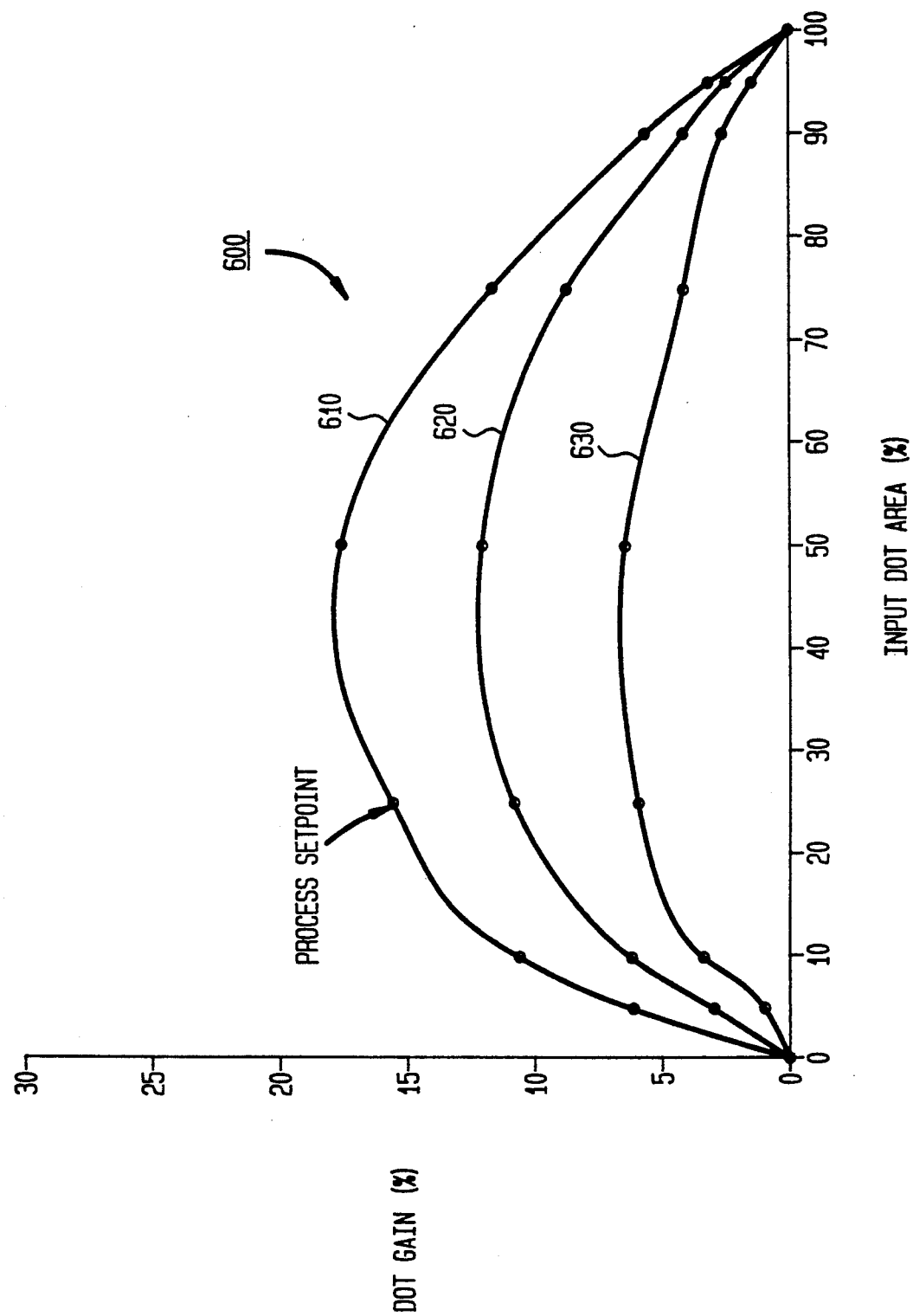
FIG. 6 graphically depicts a set of three typical "Process" curves that characterize the performance range of the DDCP (RIP/marking engine) imaging chain in DDCP system 100 shown in FIGS. 2A and 2B

In addition to specifying the "Aim" setpoints, the performance of the DDCP imaging chain, at a specific operating condition under which a proof is to be generated, is also characterized. In particular, a number of "Process" setpoints is similarly obtained, as symbolized by block 410, which collectively quantify the operation of the DDCP (here RIP/marking engine) imaging chain at this operating condition, i.e. a given screen ruling, font shape (e.g. square, round, elliptical or diamond), solid area density and separation color (cyan, magenta, yellow or black—C, Y, M or K). These "Process" setpoints, specifically generated by instructing the RIP/marking engine imaging chain to write a test pattern with generally a null dot gain curve, specify the inherent native dot gain produced by the RIP/marking engine imaging chain at that operating condition. Illustrative "Process" dot gain curves are shown in FIG. 6 and discussed in detail below. The "Process" setpoints, again typically specified for a relatively small number of input dot areas, are obtained through densitometric measurement or user input—as shown, or by reading and/or modifying an existing data file of "Process" dot gain values. These setpoints are then interpolated, using monotone piecewise cubic functions, in an identical fashion as are the "Aim" setpoints to generate a list of illustratively 256 interpolated "Process" values. These interpolated "Process" values along with corresponding "set-up" information therefor are then stored within a user specified file within "Process" data files 415 shown in FIG. 4A. While any number of a wide variety of different interpolant functions, including linear, could be used in lieu of a piecewise cubic function for the "Aim" and "Process" data, I have found that the smooth curvature provided by a cubic function tends to accurately predict the performance of the RIP/marking engine imaging chain between adjacent setpoints. I have also found that the interpolant must be monotonic, a property which certain cubic functions can provide, in order to permit the "Process" curve to be accurately inverted. As will be seen below, the values, based upon the interpolated "Aim" and "Process" values, that form the customized dot gain look-up table reflect the inversion of the "Process" dot gain curve.

Figure 4B:
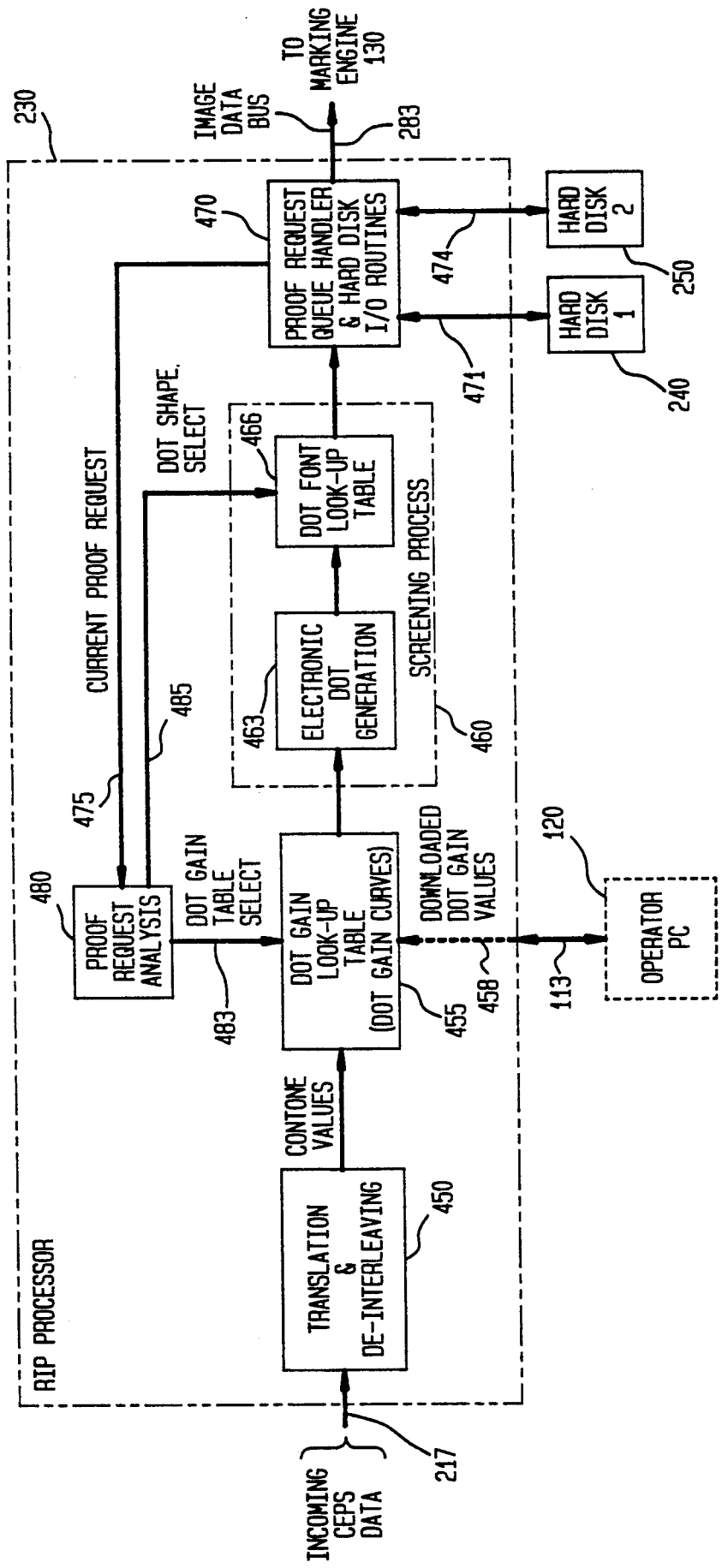
FIG. 4B depicts a simplified high level block diagram of a process through which CEPS contone separation data is processed within RIP processor 230 shown in FIGS. 2A and 2B to yield halftone image data for marking engine 130 and specifically including the processing occurring within this processor for modifying incoming contone values to achieve an "Aim" dot gain characteristic in a proof image in accordance with my present invention.

Thereafter, upon user instruction and as symbolized by block 425, a customized dot gain look-up table is constructed from the "Aim" and "Process" lists for a common operating condition. In particular, for each value in the "Aim" list, the index of the numerically closest value in the "Process" list is first determined. This index value specifies the associated input dot area, scaled in terms of, e.g. the contone values "0" to "255" for 0-100% dot area, that the DDCP imaging chain requires to produce a dot having a density that is the closest match to the density specified by that particular "Aim" value. The value of that "Process" index is then stored in a look-up table at the location defined by the index of the "Aim" value. The result is customized dot gain look-up table 430 of index values, each of which specifies a particular output halftone pattern within screening process 460 (shown in FIG. 4B and discussed below) that is to be subsequently printed by the marking engine. The index values stored in the look-up table will reflect the desired dot gain modified by the inverse of the native dot gain characteristic of the RIP/marking engine imaging chain at that operating condition. Thereafter, the dot gain values that form table 430, shown in FIG. 4A, are downloaded into RIP processor 230 to form a specific table within dot gain look-up tables 455. To generate a proof image at that condition and exhibiting the desired "Aim" curve, all the incoming contone values that are to be screened and printed for a corresponding separation are routed through look-up tables 455 to yield resulting modified contone values which, through screening process 460 shown in FIG. 4B, are then appropriately converted into halftone bits which, in turn, are eventually applied to marking engine 130 and printed thereby. The incoming contone values, after modification by the look-up table, will all have a component derived from the inverse of the native dot gain characteristic of the RIP/marking engine imaging chain and thereby cause that chain to produce a proof image that exhibits the desired "Aim" dot gain without substantially any corruption, if at all, from the native dot gain characteristic of this DDCP imaging chain. By merely changing the contents of look-up tables 455 by processing other lists of corresponding interpolated "Process" and/or desired "Aim" data, for a common operating condition, and constructing a table therefrom, the RIP/marking engine imaging chain can produce a proof image that, within physical limits occurring at that operating condition, will accurately exhibit the desired "Aim" curve and hence depict the desired tone reproduction characteristic associated therewith. As symbolized by dashed lines within RIP processor 230, this processor appropriately processes, as shown in FIG. 4B and described below in conjunction therewith, both the incoming CEPSs data to yield de-interleaved contone values that are applied, as input, to look-up tables 455 and the resulting contone values produced thereby to yield corresponding halftone bit patterns therefor.

As indicated by dashed line 440, shown in FIG. 4A, and as noted above, block 410 can obtain "Process" setpoints based upon the image densities in a proof previously generated by the DDCP imaging chain. These densities can result either by automatic densitometric measurement that occurs while that proof is being printed or through manual densitometric measurements that occur sometime after the proof has been printed. In addition, for error checking purposes, the interpolated "Process" list generated by block 410 contains an identification of the specific dot gain look-up table (usually a null dot gain table) that was used in generating that list. This identification is provided over a feedback path symbolized by dashed line 435.

FIG. 4B depicts a simplified high level block diagram of the process through which contone separation data is processed within processor 530 shown in FIGS. 2A and 2B to yield halftone image data for marking engine 130 and specifically including the contone value processing that occurs within RIP processor 230 for use in generating a proof image through marking engine 130 that, in accordance with my invention, accurately depicts a desired "Aim" dot gain characteristic.

To facilitate the explanation of FIG. 4B, assume for the moment that a proof request has reached the top of either the "rush" or "normal" queue. As such, proof request queue handler and hard disk input/output (I/O) routines 470 will have sent, through lines not shown, an instruction to a particular CEPS specified in this request to obtain corresponding interleaved separation data therefor. In response to this instruction and through an appropriate interface (any one of interfaces 212 shown in FIGS. 2A and 2B), the interleaved CEPS data appears on line 217 shown in FIG. 4B. Within RIP processor 230, this data is first translated and de-interleaved into different contone separation files by translation and de-interleaving process 450. In addition, the current proof request will have been applied, as symbolized by line 475, to proof request analysis process 480. This process, inter alia, accesses each accompanying pass parameter field delineated in that request. RIP processor 230 then determines whether the corresponding dot gain table specified in each pass parameters field has been previously downloaded thereto. If any of these tables does not exist within the processor, then RIP processor 230 sends an instruction, via link 113, to Operator PC 120 which, in turn causes this PC to download the values for this table, over link 113 and as symbolized by dashed line 458, as one of the customized dot gain look-up tables that will reside in tables 455. Thereafter, once all the necessary tables have been confirmed as existing within this processor or downloaded thereto, process 480 selects, as symbolized by line 483, the particular dot gain look-up table from those residing within tables 455 for use in processing the incoming contone values provided by process 450 for a corresponding contone separation. Accordingly, each contone value in that separation is then applied as input to this particular look-up table within tables 455 in order to impart the necessary amount of dot gain (either an increase or a decrease) to that value so as to produce a corresponding "Aim" value by marking engine 130. Each resulting modified contone value produced by tables 455 is then applied to screening process 460 which converts this contone value into an appropriate bit-mapped halftone dot pattern therefor. Process 460 can be simplistically viewed as containing electronic dot generation process 463, which generates appropriate bit-mapped values, followed by dot font look-up table 466 which, based upon these values, supplies a particularly sized halftone dot pattern in a selected dot font. The particular font to use (e.g. diamond, elliptical, square, round, gravure or composed) is selected by proof request analysis process 480 based upon the value of the byte contained within "Dot Font" field 335 (see FIG. 3A) contained in the current proof request. The resulting halftone bit-mapped image data is then applied, as shown in FIG. 4B, to proof request queue handler and hard disk I/O routines 470 for storage on that one of two hard disks 240 or 250 which is currently writing information for the current proof request. As noted above, the other hard disk is reading bit-mapped image data through process 470 for application, via image data bus 283, to marking engine 130 for printing. This same processing is repeated in seriatim to yield all the bit-mapped halftone dot patterns for the current proof request. A so-called recipe color can be formed through dot-on-dot printing of primary colored halftone dots of appropriate size. To implement recipe color generation in DDCP system 100, an additional set of tables of appropriate dot gain values would be situated between process 450 and tables 455 to generate an appropriate amount of dot gain for each overlaid primary color in a composite halftone dot. For further details regarding such an implementation, the reader is referred to co-pending United States patent application entitled "A Technique for Generating Additional Colors in a Halftone Color Image Through Use of Overlaid Primary Colored Halftone Dots of Varying Size" from applicants R. V. Barry et al, filed Sep. 18, 1991; U.S. Pat. Ser. No. 07/761,597, which is also assigned to the present assignee hereof and which is incorporated by reference herein.

Figure 5:
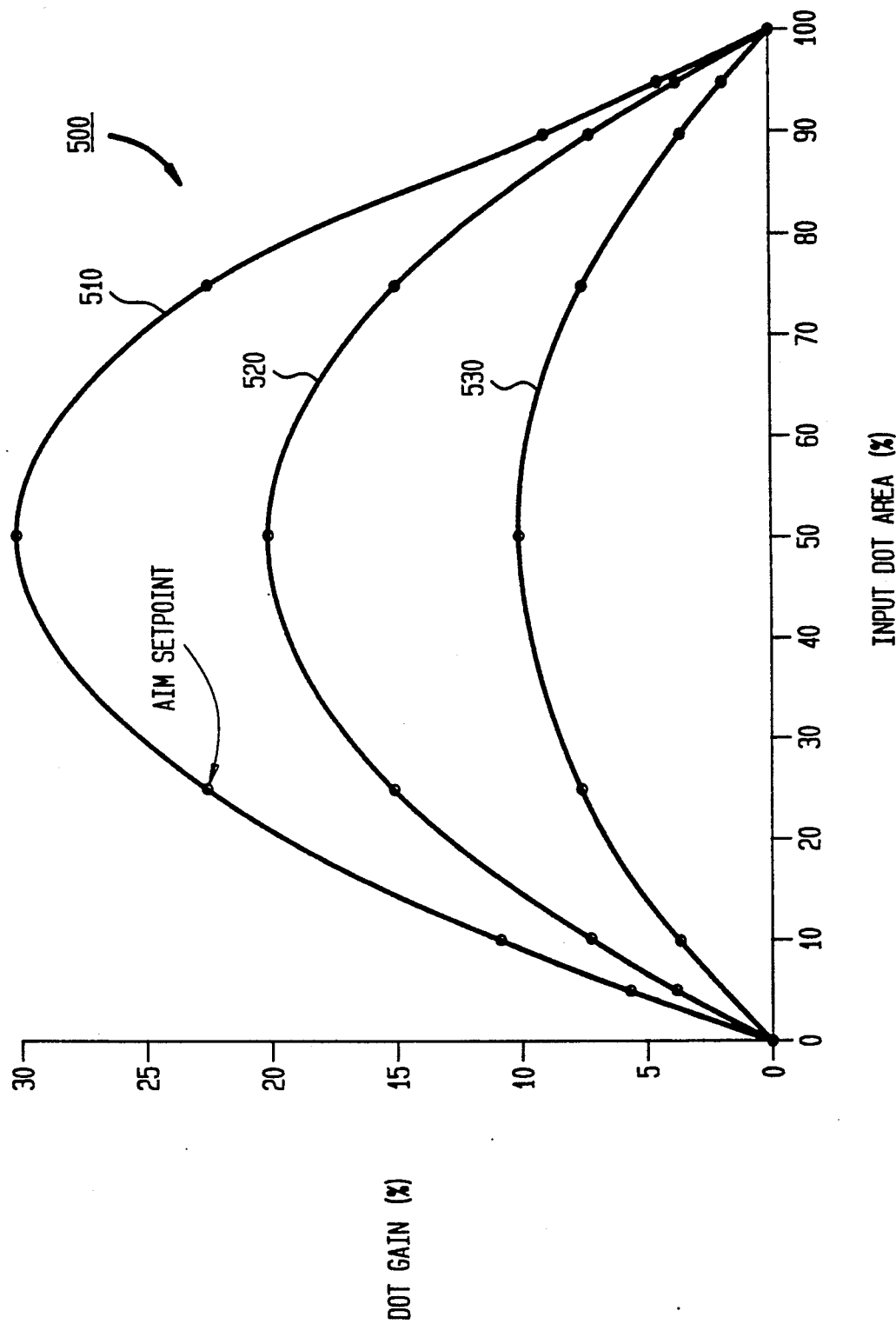
FIG. 5 graphically depicts a set of three typical "Aim" dot gain curves.

FIG. 5 graphically depicts set 500 of three typical "Aim" dot gain curves 510, 520 and 530. Each of these curves contains "Aim" setpoints, here represented by small circles and expressed in terms of dot gain, determined at illustratively 5%, 10%, 25%, 50%, 75%, 90% and 95% input dot areas, with the dot gains at both 0% and 100% input dot areas being zero. These curves typify the range of output dot gain that might be requested for "Aim" dot gain curves. As can be seen, the desired dot gain for such a 50% input dot in this separation ranges from 10–30%.

FIG. 6 graphically depicts set 600 of three typical "Process" curves 610, 620 and 630 that characterize the performance range of screening process 460 (provided by RIP processor 230) and marking engine 130 in DDCP system 100 shown in FIGS. 2A and 2B for illustratively a magenta separation printed using diamond shaped dots at a screen ruling of 150 lines/inch (approximately 59 lines/cm). Similar to curves 510, 520 and 530 shown in FIG. 5, each of curves 600 contains "Process" setpoints, here also represented by small circles and expressed in terms of dot gain, determined at illustratively 5%, 10%, 25%, 50%, 75%, 90% and 95% input dot areas, with the dot gains at both 0% and 100% input dot areas being zero. In contrast to the desired "Aim" dot gains shown in FIG. 5 of between 10–30% at a 50% output dot, without dot gain compensation, the RIP/marking engine imaging chain is capable of providing only between approximately 6–18% dot gain for a 50% output dot. Moreover, the shape of curves 600 would not match in detail the shape of curves 500 if the 50% dot gain were to be provided as desired. Therefore, it is quite clear from considering curves 500 and 600, that the DDCP imaging chain formed of RIP 200 (particularly screening process 460 occurring therein) and marking engine 130 will not by themselves, due to their collective native dot gain characteristic, produce the desired "Aim" dot gain.

FIGS. 7, 8 and 9 depict my inventive process split into three high level separately executable processes 700, 800 and 900, for execution within Operator PC 120 (shown in FIGS. 2A and 2B) by associated routines, as shown in FIGS. 10-17 and described in detail below, for implementation using a menu based user interface.

Specifically, FIG. 7 depicts a high level flowchart of process 700 for manipulating "Aim" or "Process" data. Process 700 functions in an identical fashion regardless of whether "Aim" or "Process" data is being obtained and manipulated. Upon entry into this process, block 710 is performed to obtain either "Aim" or "Process" setpoints at a specific operating condition for the RIP/marking engine imaging chain. This data, as noted above, is illustratively obtained through user input, measurement or through reading and/or modifying an existing file of data. Once the "Aim" or "Process" setpoints have been obtained, block 720 is performed to generate, through piecewise cubic interpolation, a corresponding list of 256 12-bit values therefor. After this list has been generated, block 730 is performed to plot the resulting list of interpolated "Aim" or "Process" values, if desired, on a display screen for user verification, to print this list, if desired, and then save the interpolated list along with associated "set-up" information in a user defined file. Once this file is written, process 700 terminates.

FIG. 8 depicts a high level flowchart of process 800 for creating a customized dot gain look-up table based upon the interpolated "Aim" and "Process" values produced through process 700 for a specific operating condition. Specifically, upon entry into process 800, block 810 is performed. This block prompts the user to select corresponding files of interpolated "Aim" and "Process" values that are currently stored within the Operator PC. Thereafter, block 820 is performed to create the customized dot gain look-up table, in the manner described above, based upon the values contained within the selected files. Once this table is fully created, block 830 is performed to write this table and its corresponding "set-up" information to a file for subsequent use and downloading to the marking engine. Once this file is written, process 800 terminates.

FIG. 9 depicts a flowchart of process 900 for downloading a customized dot gain look-up table created by process 800 into RIP processor 230 in DDCP system 100 shown in FIGS. 2A and 2B. In particular, once a proof request has been entered into DDCP system 100, RIP 200, specifically processor 230 contained therein, issues an instruction to the Operator PC to download, via link 113, each of the customized dot gain tables specified in that proof request from the PC into the RIP processor. As the reader will recall, a different dot gain table is typically employed for each separate halftoning pass. Hence, the filename of each such table is specified within the proof request as part of pass parameters field 380, shown in FIG. 3D and discussed in detail above, for that pass. Once the filename for a dot gain table for a given halftoning pass is obtained, decision block 920 determines whether a file under that filename (i.e. a particular "customized dot gain table") exists on the Operator PC. If such a file does not exist, then execution proceeds, via NO path 927, to block 940. This latter block, when performed, either loads a null dot gain table into RIP processor 230 for use during that pass (or instructs this processor, if it has a pre-defined null dot gain table stored therein, to utilize that table). Alternatively, if the file exists, then decision block 920 routes execution, via YES path 923, to block 930. This latter block reads the file and downloads the customized dot gain table stored therein into RIP processor 230 for subsequent use during the corresponding halftoning pass. Blocks 910, 920 and 930 are performed for each different dot gain table specified in each proof request. Once process 900 has fully executed to download all the tables specified in a proof request, this process terminates.

FIG. 10 depicts a flowchart of Dot Manager Main Routine 1000 for implementing a preferred embodiment of my present invention. This routine creates a high level menu on a display screen at the Operator PC and then initiates routines based upon user selection to perform desired portions of my inventive process.

Specifically, upon entry into routine 1000, execution proceeds to block 1010 which, when executed, displays a main menu on the display screen and prompts the user situated thereat to select an operation to be performed. Based upon a keyboard entry made by the user, decision block 1020 then routes execution to any of blocks 1030–1070 or causes execution to exit both from this routine and the entire interactive dot manager procedure and return to a higher level operating procedure. Once any of blocks 1030–1070 has fully executed, execution merely loops back, via path 1075, to block 1010 to prompt the user for the next operation, and so on.

When executed, block 1030 causes "Aim" Routine 1100 (shown in FIG. 11 and discussed in detail below) to: (a) obtain and process incoming "Aim" setpoints to generate a list of interpolated "Aim" values, (b) save a list of interpolated "Aim" values, (c) read a specified file of interpolated "Aim" values and/or (d) print a specified file of interpolated "Aim" values.

Block 1040, shown in FIG. 10, when executed, causes "Process" Routine 1400 (shown in FIG. 14 and discussed in detail below) to: (a) process incoming "Process" setpoints to generate a list of interpolated "Process" values, (b) save a list of interpolated "Process" values, (c) read a specified file of interpolated "Process" values and/or (d) print a specified file of interpolated "Process" values.

Block 1050, as shown in FIG. 10 and when executed, causes Customize Routine 1500 (shown in FIG. 15 and discussed in detail below) to: (a) produce a customized dot gain look-up table based upon lists of interpolated values contained in a pair of user specified "Aim" and "Process" files that contain matching "set-up" information, (b) save the contents of a customized dot gain look-up table (along with the corresponding "set-up" information) in a file specified by a user defined filename, (c) retrieve a customized dot gain look-up table from a user specified file, (d) display and/or edit a customized dot gain look-up table stored in a user specified file, (e) print and/or (f) plot a customized dot gain look-up table.

Block 1060, when executed and as shown in FIG. 10, will plot a corresponding pair of "Aim" and "Process" curves, with both setpoints and interpolated points, on the display screen associated with the Operator PC.

Figure 17:
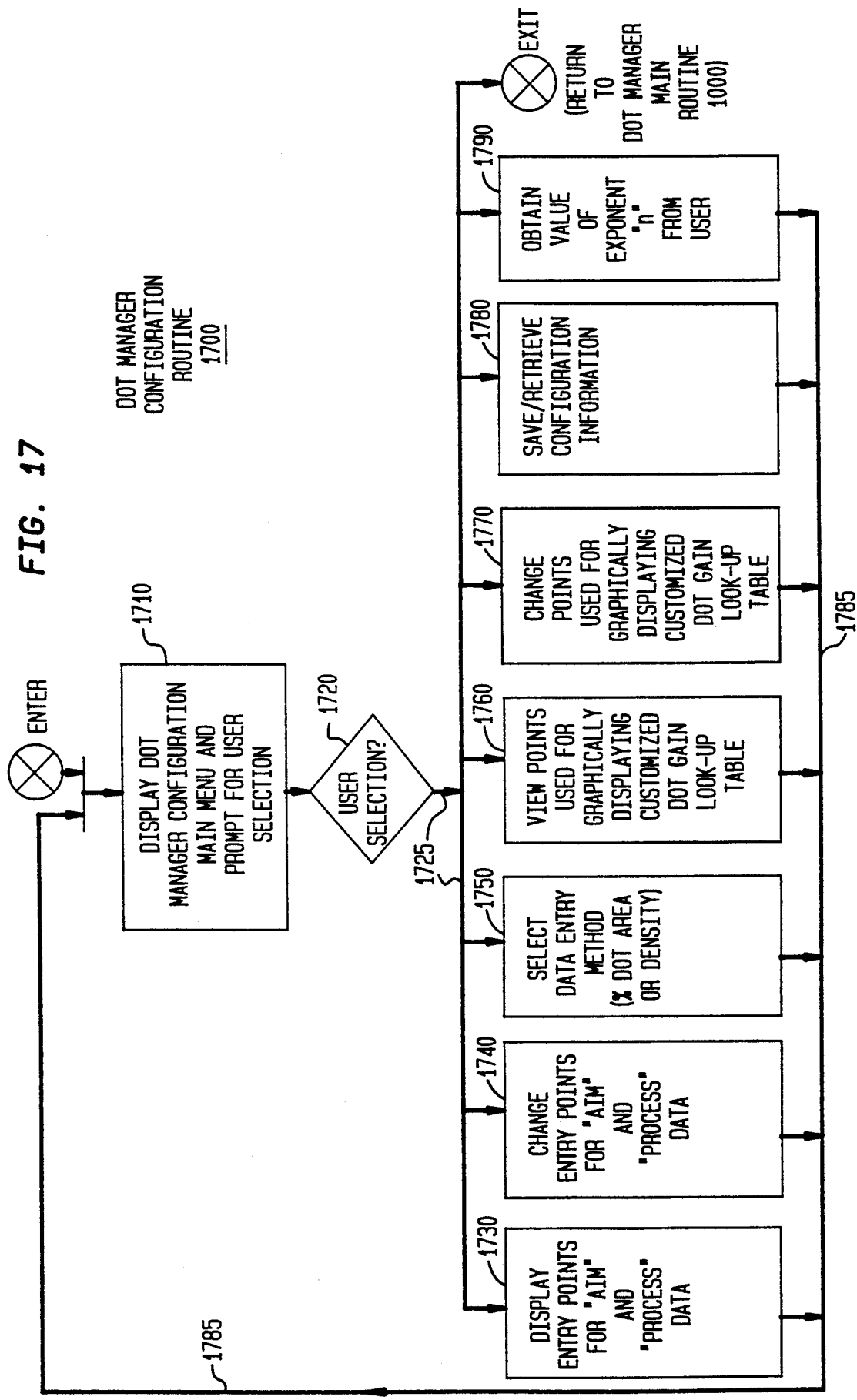
FIG. 17 depicts a flowchart of Dot Manager Configuration Routine 1700 that is executed within Dot Manager Main Routine 1000 shown in FIG. 10.

Block 1070, when executed and as shown in FIG. 17, causes Dot Manager Configuration Routine 1700 to allow the user to appropriately vary the configuration information by selecting the entry points, i.e. changing the input dot areas for entry of "Aim" and "Process" setpoints, changing the "Aim" and "Process" setpoints used for display purposes, selecting whether input data will be in the form of dot area or density and setting a value of exponent "n" in a density to dot area conversion equation (set forth below as equation (2)), viewing and/or changing points used to graphically display a customized dot gain table, saving current configuration information for subsequent use, and retrieving previously saved configuration information and configuring the software accordingly.

Figure 11:
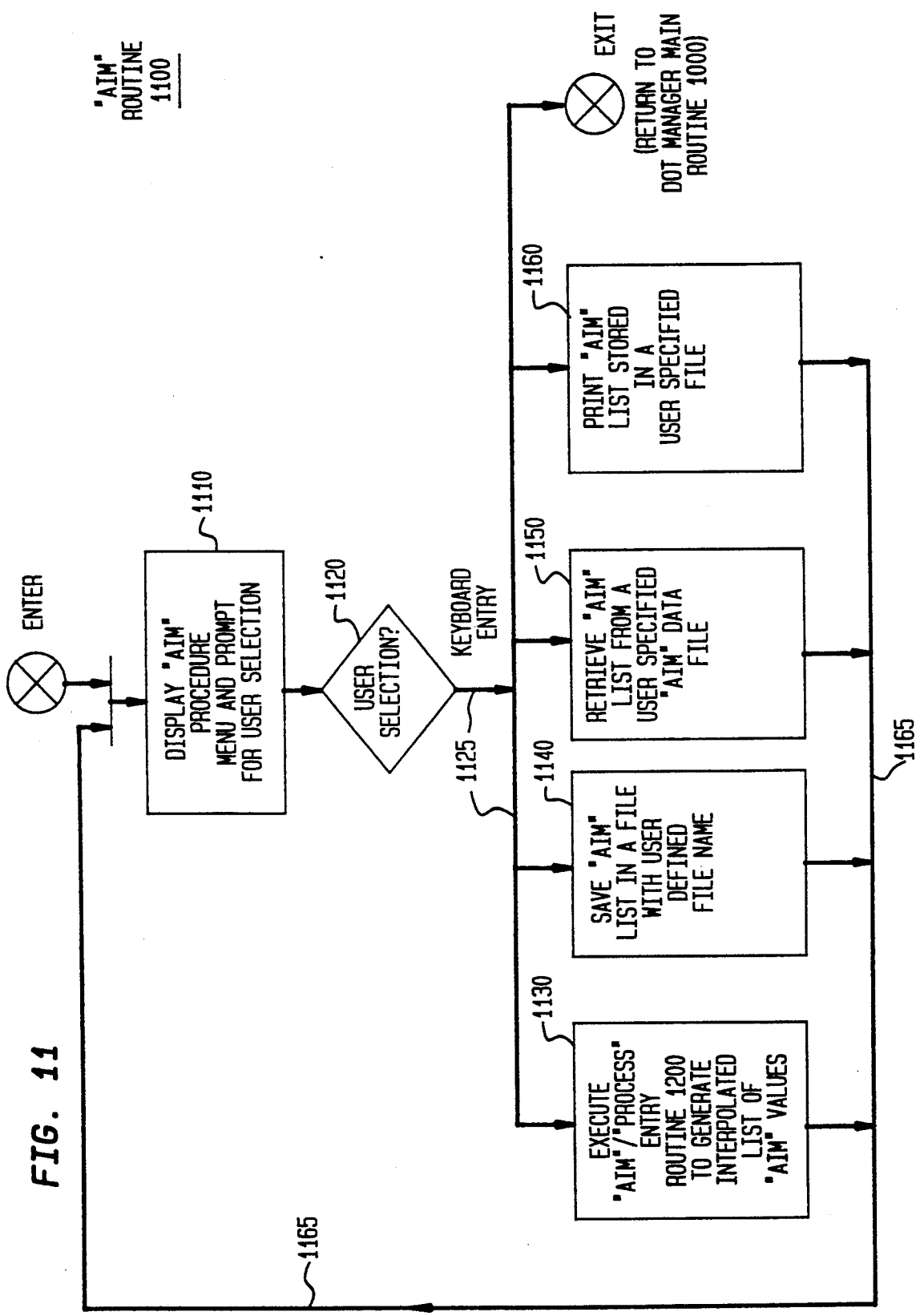
FIG. 11 depicts a flowchart of "Aim" Routine 1100 that is executed within Dot Manager Main Routine 1000 shown in FIG. 10.

FIG. 11 depicts a flowchart of "Aim" Routine 1100 that is executed within Dot Manager Main Routine 1000 shown in FIG. 10. As noted above, routine 1100 allows the user to instruct the Operator PC to perform various operations relating to "Aim" data.

Specifically, upon entry into routine 1100, execution proceeds to block 1110 which, when executed, displays an appropriate menu on the display screen and prompts the user situated thereat to select an operation to be performed on "Aim" data. Based upon a keyboard entry made by the user, decision block 1120 then routes execution, via paths 1125, to any of blocks 1130–1160 or causes execution to exit from this routine and return to Dot Manager Main Routine 1000. Once any of blocks 1130–1160 has fully executed, execution merely loops back to block 1110, via path 1165, to prompt the user to select the next "Aim" data operation to be performed, and so on.

When executed, block 1130 causes "Aim"/"Process" Routine 1200 (shown in FIGS. 12A and 12B, and discussed in detail below) to obtain and process incoming "Aim" setpoint values to generate a list of 256 interpolated "Aim" values.

Block 1140 or block 1150, when executed and shown in FIG. 11, respectively saves a list of interpolated "Aim" values in a file with a user specified filename or retrieves a list stored in such a file. When executed, block 1160 prints a specified file of interpolated "Aim" values.

Figure 12B:
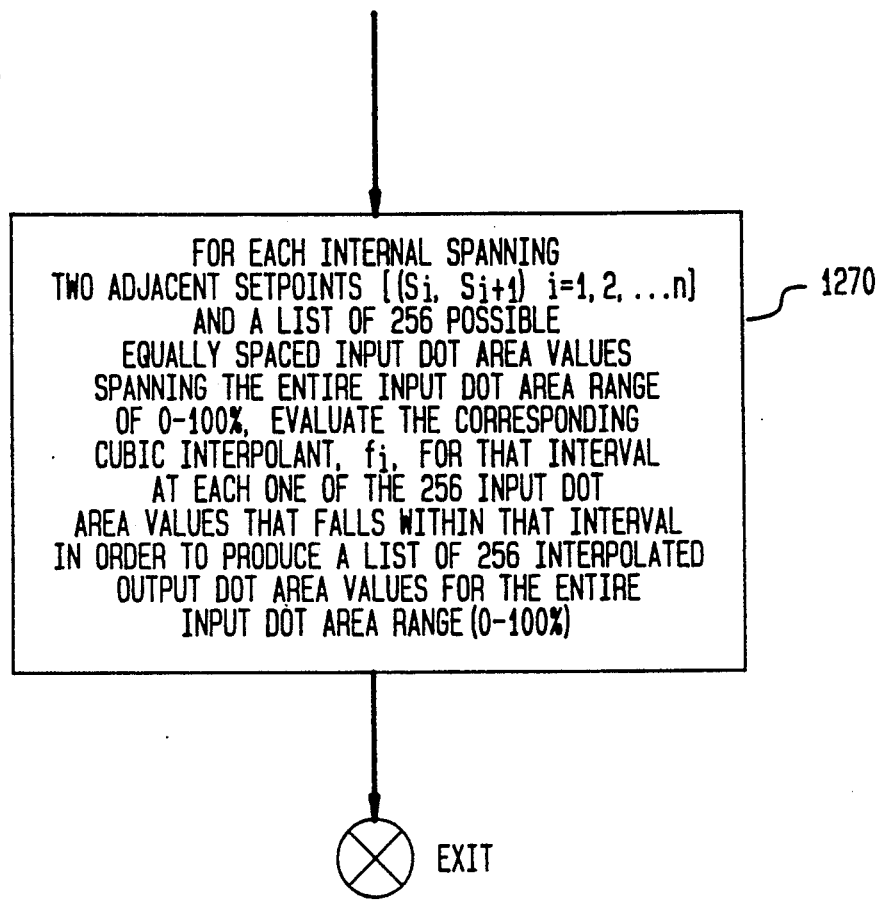
FIGS. 12A and 12B collectively depict a flowchart of "Aim"/"Process" Entry Routine 1200 that is executed within "Aim" Routine 1100 shown in FIG. 11 and "Process" Routine 1400 shown in FIG. 14.
Figure 12:
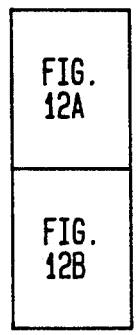
FIG. 12 depicts the correct alignment of the drawing sheets for FIGS. 12A and 12B.
Figure 12A:
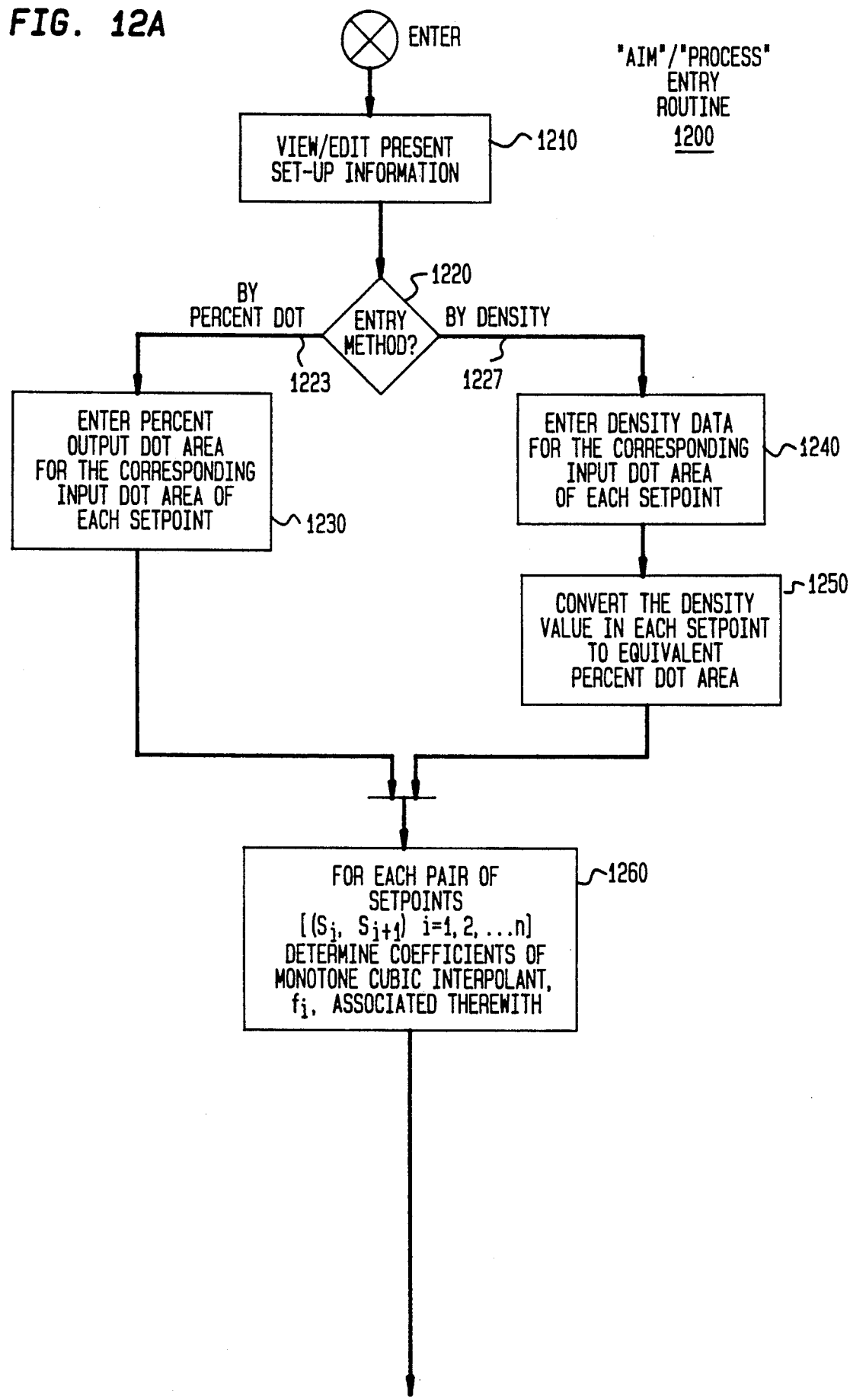
Figure 14:
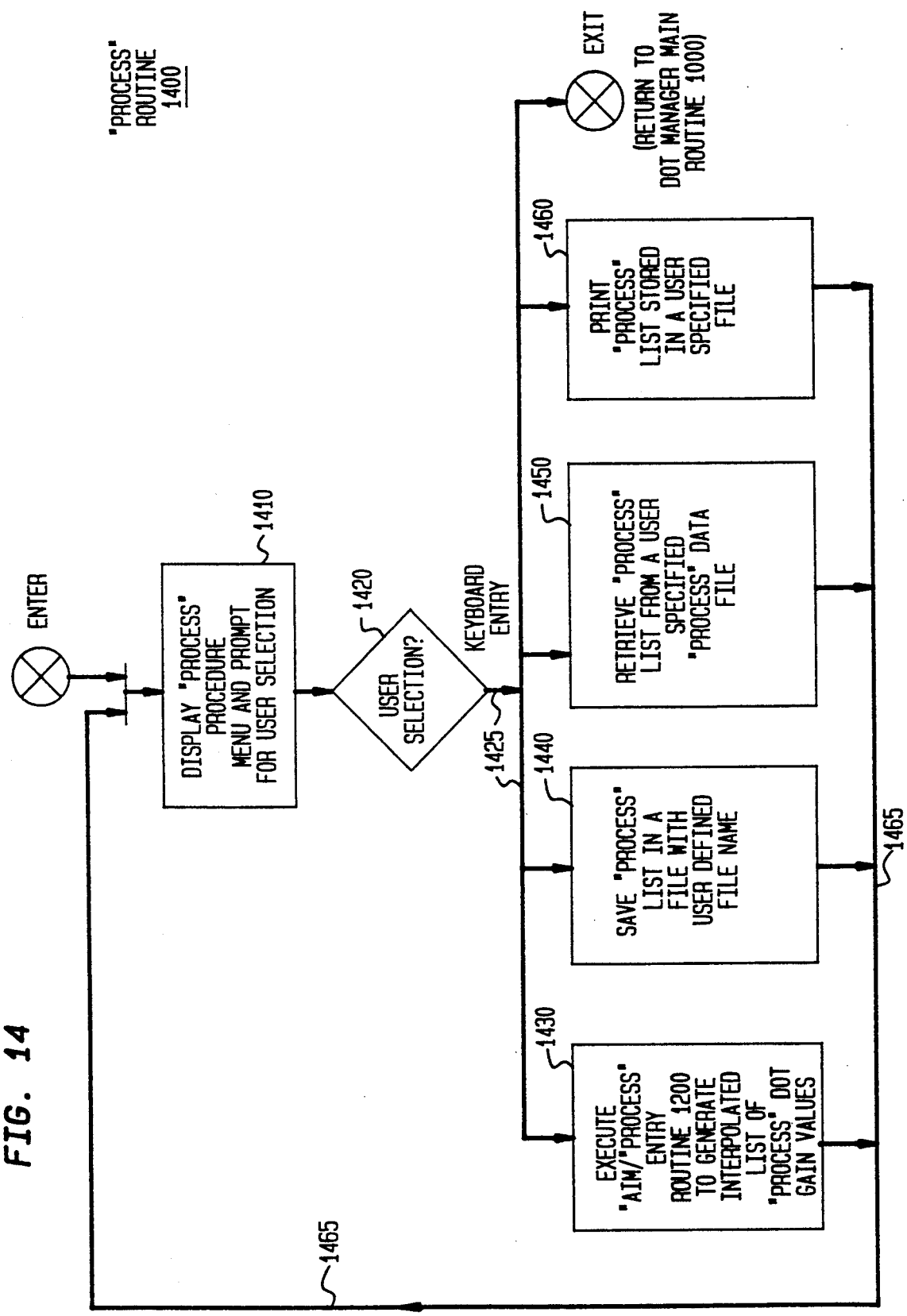
FIG. 14 depicts a flowchart of "Process" Routine 1400 that is executed within Dot Manager Main Routine 1000 shown in FIG. 10.

A flowchart of "Aim"/"Process" Entry Routine 1200 that is executed within "Aim" Routine 1100 shown in FIG. 11 and "Process" Routine 1400 shown in FIG. 14 is collectively depicted in FIGS. 12A and 12B, for which the correct alignment of the drawing sheets is shown in FIG. 12. As described above, routine 1200 obtains and processes incoming "Aim" or "Process" setpoint values to generate a corresponding list of 256 interpolated "Aim" or "Process" values. To simplify the following discussion, this routine will be specifically discussed in the context of "Aim" setpoint values.

Upon entry into routine 1200, as shown in FIGS. 12A and 12B, execution first proceeds to block 1210. This block, when executed, provides the user with an opportunity to change the "set-up" information associated with the "Aim" setpoint values that are to be entered. This information, as noted above, comprises parameters that define color, desired solid area density, screen ruling and dot font shape. The inclusion of the "set-up" information in the "Aim" file enables the Operator PC, in generating a customized dot gain look-up table, to combine the interpolated values from only those "Aim" and "Process" files, through an internal audit function, that have identical "set-up" information and hence are associated with the same operating condition for the DDCP imaging chain. Once the user has signified his acceptance of the current "set-up" information for the "Aim" file, execution proceeds from block 1210 to decision block 1220.

Decision block 1220 routes execution to either blocks 1230 or 1240 based upon whether the user has selected, through Dot Manager Configuration Routine 1700 (discussed below in connection with FIG. 17), to enter data in terms of percent dot area or density. In the event percent dot area has been selected, then, as shown in FIGS. 12A and 12B, execution proceeds, via path 1223, to block 1230. This latter block, when executed, prompts the user to enter the percent output dot area for the corresponding input dot area of each "Aim" setpoint. Once all these values have been entered, execution then proceeds to block 1260. Alternatively, if density has been selected, then execution proceeds, via path 1227, to block 1240. This latter block, when executed, prompts the user to enter the density value for the corresponding input dot area of each "Aim" setpoint. Once the user has entered all the setpoint density data and block 1240 has fully executed, execution proceeds to block 1250 which converts each density value into an equivalent percent dot area. This conversion is performed using the well known "Yule-Nielsen" equation as follows:

$$\% \text{ Dot Area} = 100\% \frac{1 - 10(D_{min} - D_{tint})/n}{1 - 10(D_{min} - D_{max})/n} \quad (2)$$

where:

$D_{max}$ = the solid area density of the dot;
$D_{min}$ = the base optical reflection density of the paper (or other media on which the proof image is to be printed);
$D_{tint}$ = the optical density of a halftone pattern; and
$n$ = a user specified real exponent.

For further information regarding this equation, the reader is referred to, e.g., pages 205–216 and particularly page 215 of Chapter 8 "Additivity and Proportionality of Densities" of J.A.C. Yule, *Principles of Color Reproduction* (©1967: John Wiley & Sons, Inc., New York). Once all the density values have been converted to equivalent percent dot areas, execution proceeds to block 1260.

Figure 13A:
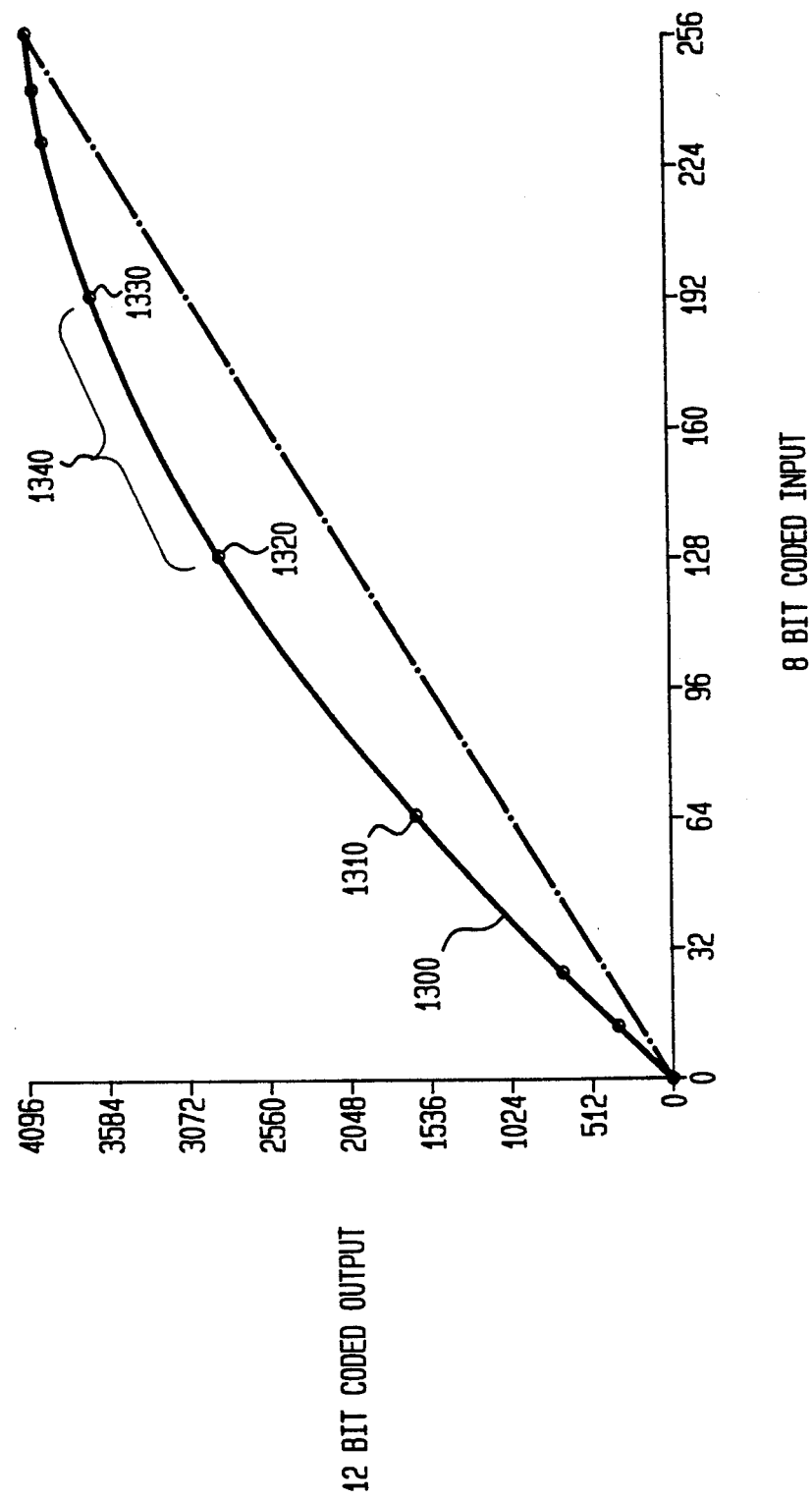
FIG. 13A graphically depicts typical monotone cubic interpolated "Aim" curve 1300 expressed in terms of 8-bit coded (contone) input values vs. 12-bit coded (contone) output values.

Block 1260, when executed, determines the coefficients of a monotone piecewise cubic interpolant function that passes through each pair of adjacent setpoints, interpolates between each pair of setpoints with a monotone cubic polynomial and preserves the continuity of derivative at each interior setpoint. As noted above, the use of a monotone piecewise cubic function imparts a needed degree of curvature to the "Process" data that accurately predicts the actual physical performance of the RIP/marking engine imaging chain between adjacent setpoints. To facilitate understanding, FIG. 13A graphically depicts typical interpolated "Aim" curve 1300 expressed in terms of 8-bit coded (contone) input values vs. 12-bit coded (contone) output values, with "0" and "255" respectively representing 0% and 100% input dot area, and "0" and "4095" representing 0% and 100% output dot areas. Curve 1300 corresponds to "Aim" dot gain curve 510 shown in FIG. 5 and contains seven setpoints (apart from "0" and "4095") including, as shown in FIG. 13A, setpoints 1310, 1320 and 1330. The coefficients of a monotone piecewise cubic interpolant function, $f_i$, are determined for each interval i, such as interval 1340, that spans two adjacent setpoints [($S_i$, $S_{i+1}$) where i=1, 2, ..., n], in this case setpoints 320 and 1330. This interpolation process is described in detail in, e.g., F. N. Fritsch et al, "Monotone Piecewise Cubic Interpolation", *SIAM Journal of Numerical Analysis*, Vol. 17, No. 2, April 1980, pages 238–246 (hereinafter referred to as the Fritsch et al paper), which is incorporated by reference herein. In utilizing the interpolation described in the Fritsch paper, I chose, as described on page 242 of this paper, to employ set 2 as a constraint on each interpolant function. Inasmuch as the detailed steps for undertaking monotone piecewise cubic interpolation in accordance with the method described in the Fritsch et al paper would be readily apparent to anyone skilled in the art, then, for the sake of brevity, I have omitted all such details from the following discussion.

Figure 13B:
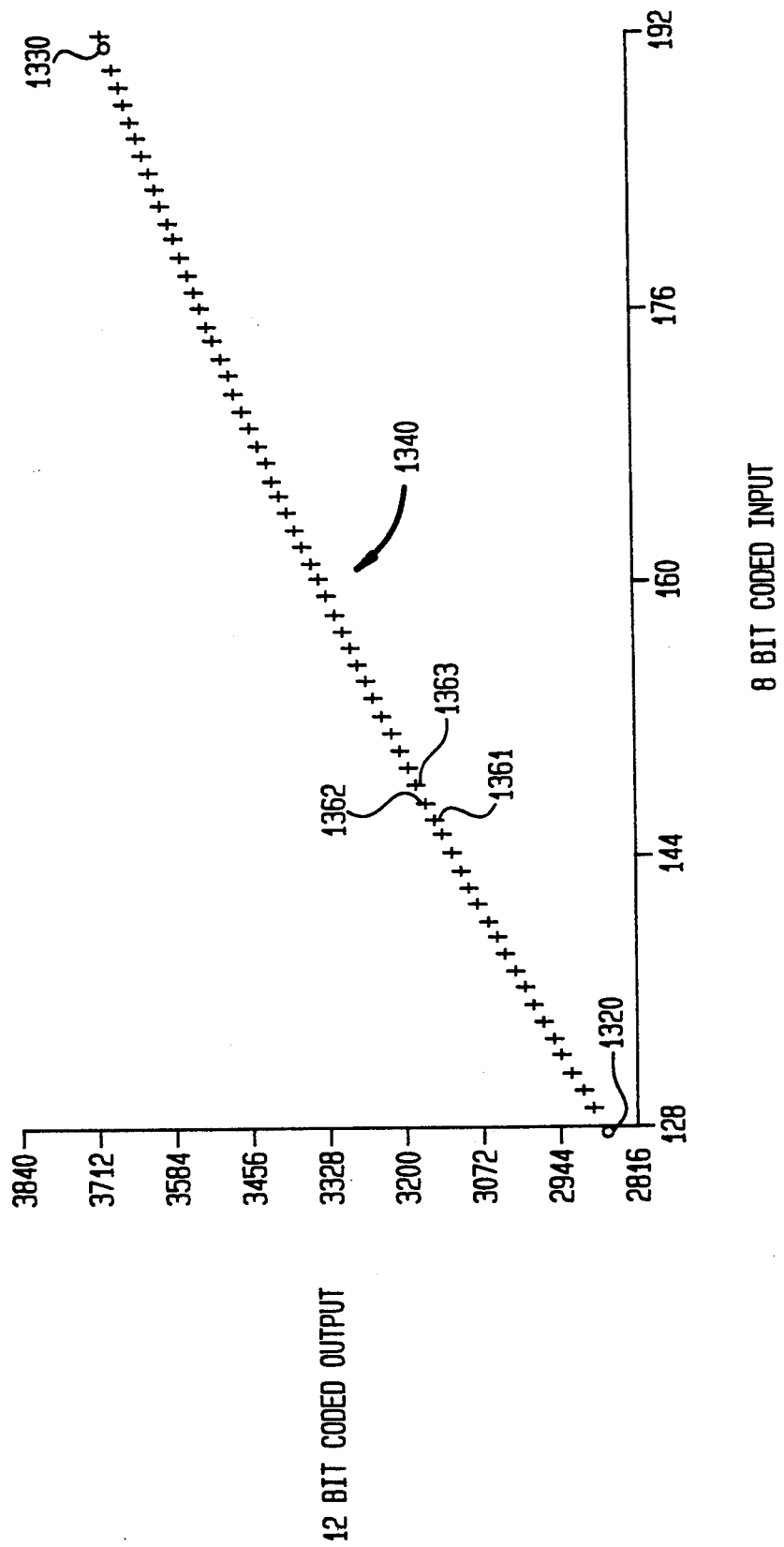
FIG. 13B depicts an expanded view of segment 1340 of monotone cubic interpolated "Aim" curve 1300 shown in FIG. 13A and the individual illustrative points at which the associated cubic interpolant function for this segment is separately evaluated.

Once all the coefficients of all the interpolant functions for the "Aim" setpoints have been determined, then execution proceeds to block 1270. This block, when executed, evaluates the interpolant function for every interval such that an interpolated "Aim" value will be generated for each possible incremental input dot area, or as shown each incremental 8-bit input value, i.e. from "0" to "255". Specifically, the interpolant function associated with each interval is successively evaluated at those eight-bit input values which fall on the end of or within that interval to yield corresponding output dot areas. In this regard, FIG. 13B depicts an expanded view of segment 1340 of monotone cubic interpolated "Aim" curve 1300 shown in FIG. 13A and the individual illustrative points at which the associated cubic interpolant function for this segment is separately evaluated. Each successive 8-bit input value, that lies within interval 1340, spanned by setpoints 1320 and 1330, is shown as a hash mark on the abscissa. The resulting evaluated values, of which values 1361, 1362 and 1363 are illustrative, are marked as "+". As a result of evaluating all the interpolants, a list of 256 12-bit interpolated "Aim" values is produced. At this point, block 1270 has completed. Execution then exits from "Aim"/"Process" Entry Routine 1200.

FIG. 14 depicts a flowchart of "Process" Routine 1400 that is executed within Dot Manager Main Routine 1000 shown in FIG. 10. Routine 1400 provides the same functionality as "Aim" Routine 1100, shown in FIG. 11 and discussed above, but in connection with "Process" data rather than "Aim" data.

Specifically, upon entry into routine 1400, execution proceeds to block 1410 which, when executed, displays an appropriate menu on the display screen at the Operator PC and prompts the user situated thereat to select an operation to be performed on "Process" data. Based upon a keyboard entry made by the user, decision block 1420 then routes execution, via paths 1425, to any of blocks 1430-1460 or causes execution to exit from this routine and return to Dot Manager Main Routine 1000. Once any of blocks 1430-1460 has fully executed, execution merely loops back to block 1410, via path 1465, to prompt the user to select the next "Process" data operation to be performed, and so on.

When executed, block 1430 causes "Aim"/"Process" Routine 1200 (shown in FIGS. 12A and 12B, and discussed in detail above) to obtain and process incoming "Process" setpoint values to generate a list of 256 interpolated "Process" values.

Blocks 1440 or 1450, when executed and shown in FIG. 14, respectively save a list of interpolated "Process" values in a file with a user specified filename or retrieve a list stored in such a file. When executed, block 1460 prints a specified file of interpolated "Process" values.

Figure 15:
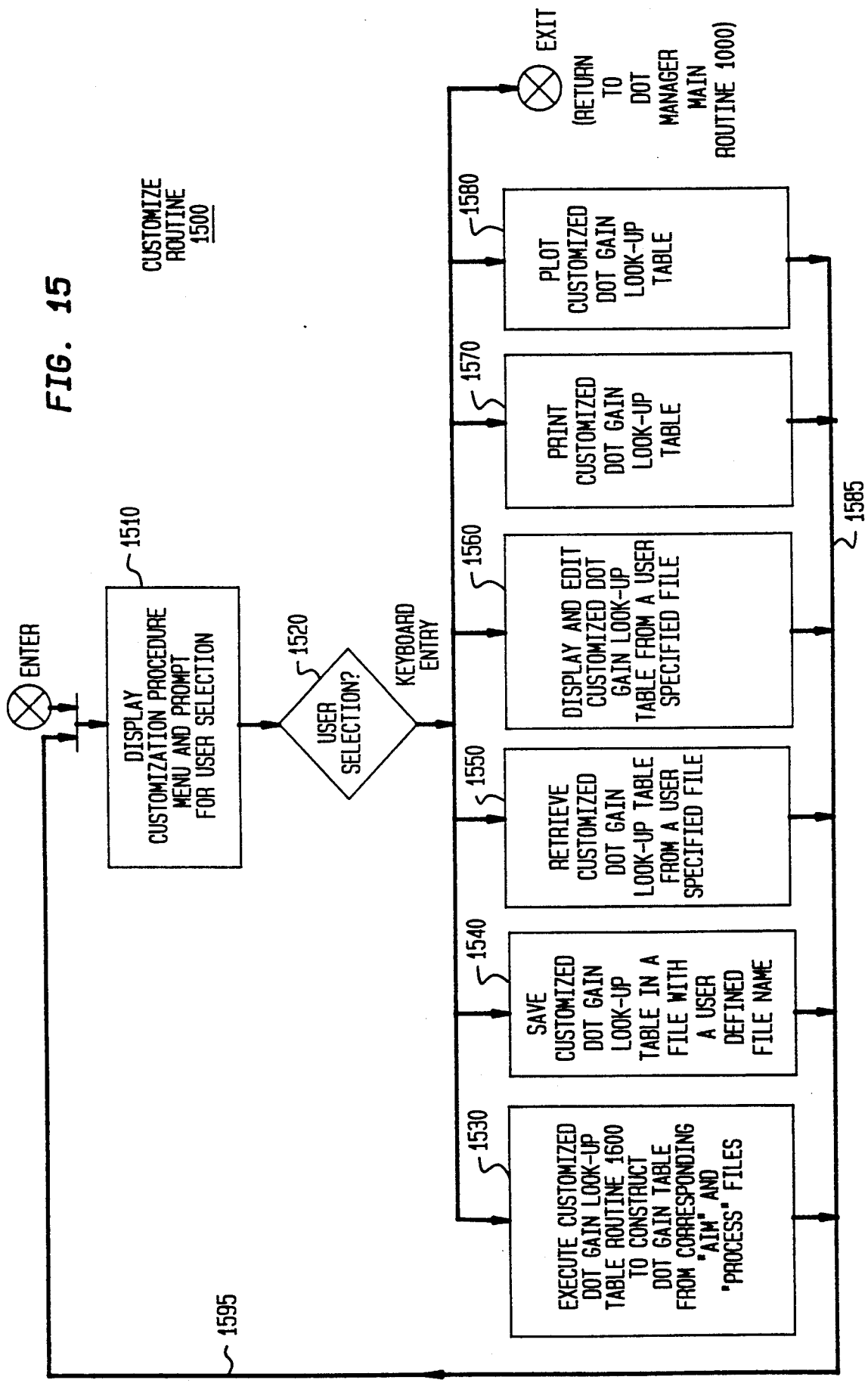
FIG. 15 depicts a flowchart of Customize Routine 1500 that is executed within Dot Manager Main Routine 1000 shown in FIG. 10.

FIG. 15 depicts a flowchart of Customize Routine 1500 that is executed within Dot Manager Main Routine 1000 shown in FIG. 10. Routine 1500, as described above, allows the user to instruct the Operator PC to perform various operations relating to customized dot gain data.

Specifically, upon entry into routine 1500, execution proceeds to block 1510 which, when executed, displays an appropriate menu on the display screen and prompts the user situated thereat to select an operation to be performed on customized dot gain data. Based upon a keyboard entry made by the user, decision block 1520 then routes execution, via paths 1525, to any of blocks 1530-1580 or causes execution to exit from this routine and return to Dot Manager Main Routine 1000. Once any of blocks 1530-1580 has fully executed, execution merely loops back to block 1510, via path 1585, to prompt the user to select the next customized dot gain data operation to be performed, and so on.

When executed, block 1530 causes Customized Dot Gain Look-Up Table Routine 1600 (shown in FIGS. 16A and 16B, and discussed in detail below) to process a pair of user specified files of interpolated "Aim" and "Process" values, that have matching "set-up" information, to generate values for a customized dot gain look-up table.

Blocks 1540 or 1550, when executed and shown in FIG. 15, respectively save the values for a customized dot gain look-up table (along with the corresponding "set-up" information) in a file specified by a user defined filename) or retrieve these values (and the corresponding "set-up" information) from such a file. When executed, block 1560 displays and permits a user to appropriately edit the values that form a customized dot gain table stored in a user specified file. Block 1570, when executed, prints a table of customized dot gain values (along with corresponding "set-up" information) stored in a user specified file. Lastly, block 1580, when executed, graphically plots the customized dot gain values that form a current table, such as that which was just produced through execution of any of blocks 1530-1570.

Figure 16B:
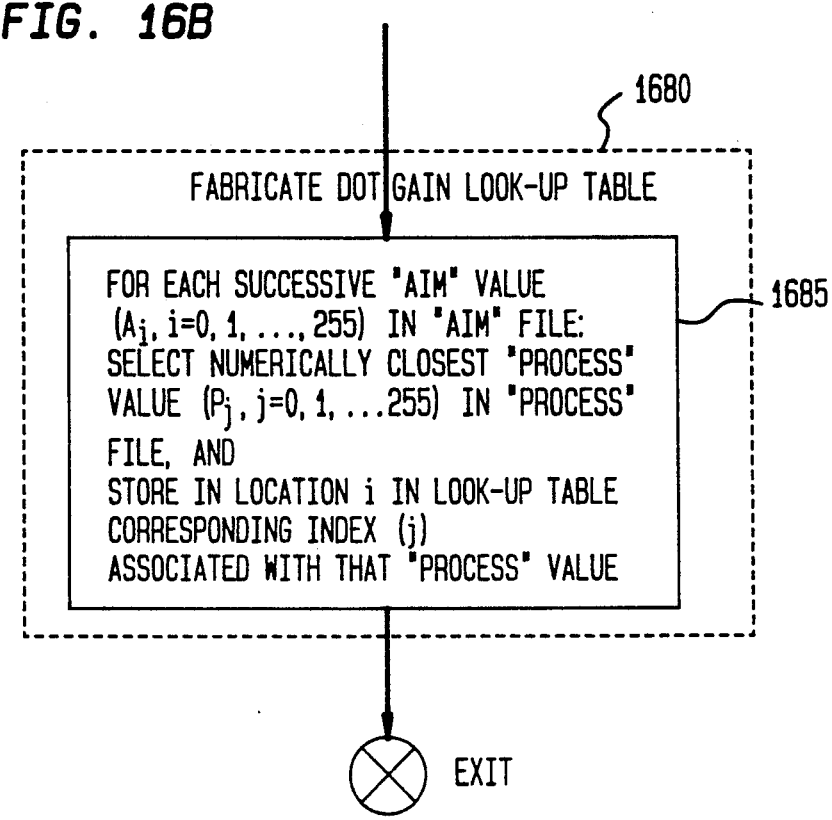
FIGS. 16A and 16B collectively depict a flowchart of Customized Dot Gain Look-up Table Routine 1600 that is executed within Customize Dot Gain Routine 1500 shown in FIG. 15.
Figure 16:
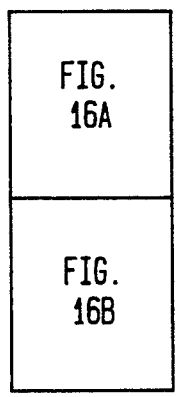
FIG. 16 depicts the correct alignment of the drawing sheets for FIGS. 16A and 16B.
Figure 16A:
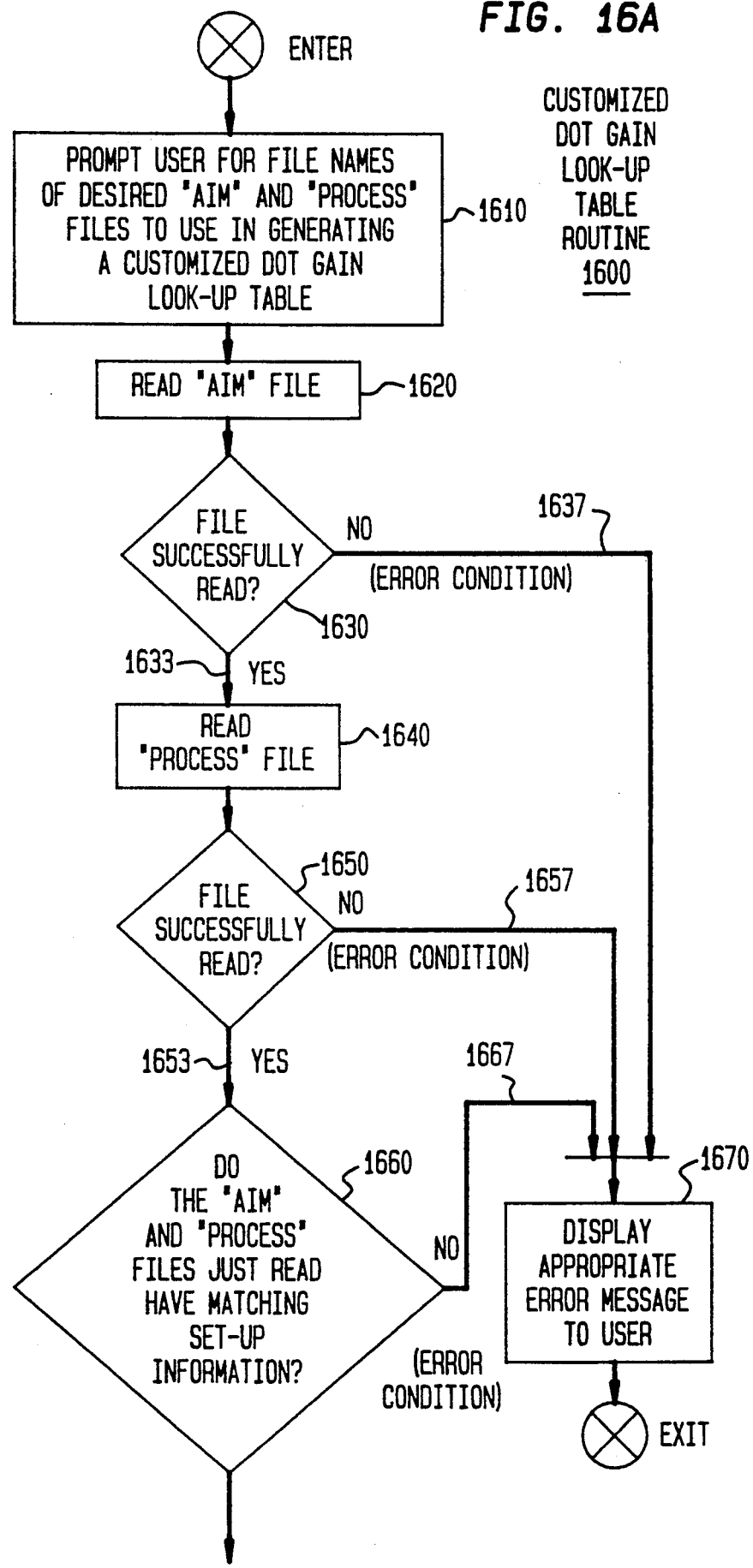

A flowchart of Customized Dot Gain Look-up Table Routine 1600 that is executed within Customize Dot Gain Routine 1500 shown in FIG. 15 is collectively depicted in FIGS. 16A and 16B, for which the correct alignment of the drawing sheets for these figures is shown in FIG. 16. As described above, routine 1600 produces a customized dot gain look-up table based upon lists of interpolated values contained in a pair of user specified "Aim" and "Process" files that contain matching "set-up" information.

Specifically, upon entry into routine 1600, execution proceeds to block 1610. This block prompts the user to enter the file names of the desired "Aim" and "Process" files that contain interpolated "Aim" and "Process" values for use in generating a customized dot gain look-up table. Once this occurs, block 1620 is executed to read this "Aim" file. Once this file has been read or, if unsuccessful, an attempt has been made to do so, execution proceeds to decision block 1630. If this "Aim" file has not been successfully read, then an error condition has occurred. Hence, decision block 1630 routes execution, via NO path 1637, to block 1670. This latter block, when executed, displays an appropriate error message on the display screen of the Operator PC. Thereafter, execution exits from routine 1600 and returns to Customize Routine 1500 (shown in FIG. 15).

Alternatively, if this "Aim" file has been successfully read, then decision block 1630, shown in FIGS. 16A and 16B, routes execution, via YES path 1633, to block 1640. This latter block, when executed, reads the user specified "Process" file. Once this file has been read or, if unsuccessful, an attempt has been made to do so, execution proceeds to decision block 1650. If this "Process" file has not been successfully read, then an error condition has occurred. Hence, decision block 1650 routes execution, via NO path 1657, to block 1670. This latter block, when executed, displays an appropriate error message on the display screen of the Operator PC. Thereafter, execution exits from routine 1600 and returns to Customize Routine 1500 (shown in FIG. 15).

Now, if the "Process" file has been successfully read as well, decision block 1650, shown in FIGS. 16A and 16B, routes execution, via YES path 1653, to decision block 1660. This latter decision block determines whether the "set-up" information stored in both the user specified "Aim" and "Process" files that have just been read is identical To be valid, a customized dot gain look-up table can only be constructed from interpolated "Aim" and "Process" values that, respectively, are to be and have been generated by the RIP/marking engine imaging chain under the same operating condition (i.e. color, solid area density screen ruling and dot font shape). If the "set-up" information for these two files does not match, then an error condition occurs. In this case, decision block 1660 routes execution, via NO path 1667, to block 1670. This latter block, when executed, displays an appropriate error message on the display screen of the Operator PC. Thereafter, execution exits from routine 1600 and returns to Customize Routine 1500 (shown in FIG. 15).

In the event that the "set-up" information for the "Aim" and "Process" files matches, then decision block 1660, shown in FIGS. 16A and 16B, routes execution, via YES path 1663, to Fabricate Dot Gain Look-Up Table block 1680. This block, when executed, executes block 1685 which, for each successive interpolated value from the "Aim" file ($A_i$, $i=0, 1, \ldots, 255$), selects the numerically closest interpolated value, $P_j$ ($j=0, 1, \ldots, 255$), from the "Process" file. The index, j, associated with the selected interpolated "Process" value is then stored in location "i" in a 256 location table. This table, once completely filled, forms a customized dot gain look-up table. Once all the values of the customized dot gain look-up table have been determined, execution exits from blocks 1685 and 1680, and then from routine 1600.

FIG. 17 depicts a flowchart of Dot Manager Configuration Routine 1700 that is executed within Dot Manager Main Routine 1000 shown in FIG. 10. As discussed above, routine 1700 allows the user, through the Operator PC, to appropriately vary, save and retrieve the configuration associated with processing "Aim" and "Process" setpoints and displaying and plotting the values of a customized dot gain table.

Specifically, upon entry into routine 1700, execution proceeds to block 1710 which, when executed, displays an appropriate menu on the display screen associated with the Operator PC and prompts the user situated thereat to select an operation to be performed relating to configuration information. Based upon a keyboard entry made by the user, decision block 1720 then routes execution, via paths 1725, to any of blocks 1730-1790 or causes execution to exit from this routine and return to Dot Manager Main Routine 1000. Once any of blocks 1730-1790 has fully executed, execution merely loops back to block 1710, via path 1785, to prompt the user to select the next configuration operation to be performed, and so on.

When executed, block 1730 displays the input dot areas associated with the setpoints for the "Aim" and "Process" data. Block 1740, when executed, permits the user to change these input dot areas, as desired, for the "Aim" and "Process" data. When executed, block 1750 prompts the user to select whether incoming "Aim" or "Process" data is to be supplied in either percent dot area or density. As noted above, input "Aim" and "Process" values that are provided in terms of density are converted into equivalent dot area (in this regard, see block 1250 in "Aim"/"Process" Entry Routine 1200 shown in FIGS. 12A and 12B and discussed in detail above). Block 1790, shown in FIG. 17, when executed, permits the user to enter a value for exponent "n" used in equation (2) above for converting input density values into equivalent input dot areas.

Blocks 1760 and 1770, when executed, respectively list the specific points that are to be used to graphically display a customized dot gain look-up table and permit the user to change these points, as desired. Block 1780, when executed, saves the current configuration information, which the user has just defined, for subsequent retrieval and use, or retrieves and loads previously saved configuration information as selected by the user and then appropriately configures the above described software accordingly.

Even though my invention has been described in terms of obtaining "Aim" and "Process" data through any of three specific ways, such as user input, densitometric measurements of images or through reading and/or editing an existing file of data, use of my invention is independent of the specific manner in which this data is acquired. In that regard, my invention can be used in conjunction with any "Aim" and "Process" data regardless of the specific manner through which that data has been obtained—i.e. whether that manner is one of the three described above or a different manner, provided the data that is to be used to form a customized dot gain look-up table applies to matching operating conditions of the DDCP imaging chain.

Furthermore, those skilled in the art will clearly realize that although the invention has been specifically described in terms of a system for generating color proof images, my invention can be used in any imaging system, in which a marking engine or other output device has a native dot gain (or other tone reproduction) characteristic, for producing an output image, from digitized input values, that depicts a desired tone reproduction characteristic and is substantially free of any corruption attributable to that native characteristic. These digitized input values can represent contone values, as described above, or other image density based information.

Although one embodiment of the present invention has been shown and described in detail herein, many other varied embodiments that incorporate the teachings of my invention may be easily constructed by those skilled in the art.

INDUSTRIAL APPLICABILITY AND ADVANTAGES

The present invention is useful in connection with nearly any imaging system, and particularly that used in a direct digital color proofing (DDCP) system, for imparting very accurate tone reproduction in an output image, such as a color proof image. Through use of the invention in, for example, a DDCP system significantly more accurate dot gain control and hence tone reproduction can be implemented than that which has heretofore been provided in proofing systems known in the art.

I claim:

1. Apparatus for generating, through an imaging system having a native tone reproduction characteristic, an output image that depicts an input image such that the output image is substantially free of corruption attributable to the native tone reproduction characteristic of the imaging system, said apparatus comprising:

means, responsive to first data values representing a desired tone reproduction characteristic of the input image that is to be reproduced at a specific operating condition of the imaging system and to second data values representing an actual tone reproduction characteristic of the imaging system obtained at said operating condition, for forming a table of values representing the first data values modified by an inverse function of the second data values;

means, responsive to incoming digitized values that collectively represent the input image for routing each of said digitized values through the table to produce a corresponding modified value therefor so as to form a plurality of modified values; and means for generating said output image in response to each of said modified values.

2. The apparatus in claim 1 wherein said imaging system comprises a processor, and a marking engine connected to the processor.

3. The apparatus in claim 2 wherein said table forming means comprise:

first means for accepting said first data values at a plurality of first predetermined setpoints and for interpolating said first data values to yield first interpolated values;

second means for accepting said second data values at a plurality of second predetermined setpoints and for interpolating said second data values to yield second interpolated values; and means, responsive to said first and second interpolated values, for generating the values that form the table.

4. The apparatus in claim 3 wherein said first and second data value accepting and interpolating means comprises means for processing said first and second data values, respectively, to yield interpolated data values for all possible input dot areas associated with said first and second data values.

5. The apparatus in claim 4 wherein said value generating means comprises:

means for selecting a corresponding one of said second interpolated values that is numerically closest of all of the second interpolated values to each one of the first interpolated values; and means for writing an index value associated with said corresponding one of the second interpolated values in a location in the table given by an index value associated with said one of the first interpolated values.

6. The apparatus in claim 4 wherein said processing means comprises:

means for determining coefficients of a monotone piecewise cubic function that spans an interval defined by each pair of adjacent ones of said first data values and an interval defined by each pair of adjacent ones of said second data values; and means for evaluating the monotone piecewise cubic function for each such interval for said first and second data values at predefined incremental input dot areas that fall on the ends of or within that interval so as to collectively yield said first and second interpolated values, respectively.

7. The apparatus in claim 3 wherein said tone reproduction characteristic is dot gain.

8. The apparatus in claim 7 wherein said digitized values are continuous tone (contone) values.

9. The apparatus in claim 8 wherein said input image is a color image and output image is a color halftone proof image formed of properly registered color halftone separations.

10. The apparatus in claim 9 wherein, for each of said color halftone separations, said operating condition is defined by a color at which said separation is to be written by the marking engine, a value of solid area density and dot font shape that are to be written by the marking engine in said each separation, and a screen ruling that is to be used in generating said each separation.

11. A direct digital color proofing system for generating a color halftone proof image from incoming digitized pre-press continuous tone (contone) data for an input image, said system having means for processing the incoming pre-press contone data to yield screened halftone separation data representing halftone separations that are to collectively form the proof image, a marking engine for writing each of said halftone separations with proper registration so as to form said proof image, and control means connected to said processing means and said marking engine, wherein said processing means and said marking engine collectively form an imaging chain having a native dot gain characteristic and said system generates generating the proof image such that the proof image is substantially free of corruption attributable to the native dot gain characteristic, said system comprising:

means, responsive to first data values representing a desired dot gain characteristic of the input image and to second data values representing the native dot gain characteristic of the imaging chain, for forming a table of values representing the first data values modified by an inverse function of the second data values; and means, responsive to incoming digitized values that collectively represent each one of a plurality of continuous tone separations, for routing each of the digitized values through the table to produce a corresponding modified value therefor so as to form a plurality of modified values; and means for converting each of the modified values for each one of said separations into a corresponding halftone bit pattern so as to form a plurality of halftone bit patterns and applying each of said corresponding halftone bit patterns to said marking engine so as to write said one separation on a predefined media.

12. The system in claim 11 wherein the first data values represent the desired dot gain characteristic of the input image that is to be reproduced at a specific operating condition of the imaging chain, and the second data values represent the actual dot gain characteristic of the imaging chain obtained at said operating condition.

13. The system in claim 12 wherein said table forming means comprise first means for accepting said first data values at a plurality of first predetermined setpoints and for interpolating said first data values to yield first interpolated values;

second means for accepting said second data values at a interpolating said second data values to yield second interpolated values; and means, responsive to said first and second interpolated values, for generating the values that form the table.

14. The system in claim 13 wherein said first and second data value accepting and interpolating means comprises means for respectively processing said first and second data values to yield interpolated data values for all possible input dot areas associated with said first and second data values.

15. The system in claim 14 wherein said value generating means comprises:

means for selecting a corresponding one of said second interpolated values that is numerically closest of all of the second interpolated values to each one of the first interpolated values; and means for writing an index value associated with said location in the table given by an index value associated with said one of the first interpolated values.

16. The system in claim 14 wherein said processing means comprises:

means for determining coefficients of a monotone piecewise cubic function that spans an interval defined by each pair of adjacent ones of said first data values and an interval defined by each pair of adjacent ones of said second data values; and means for evaluating the monotone piecewise cubic function for each such interval for said first and second data values at predefined incremental input dot areas that fall on the ends of or within that interval so as to collectively yield said first and second interpolated values, respectively.

17. The system in claim 14 wherein, for each of said color halftone separations, said operating condition is defined by a color at which said separation is to be written by the marking engine, a value of maximum solid area density and dot font shape that are to be written by the marking engine in said each separation, and a screen ruling that is to be used in generating said each separation.

18. A method for generating, through an imaging system having a native tone reproduction characteristic, an output image that depicts an input image such that the output image is substantially free of corruption attributable to the native tone reproduction characteristic of the imaging system, said method comprising the steps of:

forming, in response to first data values representing a desired tone reproduction characteristic of the input image that is to be reproduced at a specific operating condition of the imaging system and to second data values representing an actual tone reproduction characteristic of the imaging system obtained at said operating condition, a table of values representing the first data values modified by an inverse function of the second data values;

routing each one of a plurality of digitized values that collectively represent the input image through the table to produce a corresponding modified value therefor so as to form a plurality of modified values; and generating the output image in response to each of the modified values.

19. The method in claim 18 wherein said imaging system comprises a processor, and a marking engine connected to the processor.

20. The method in claim 19 wherein said table forming step comprises the steps of:

first accepting said first data values at a plurality of first predetermined setpoints and for interpolating said first data values to yield first interpolated values;

second accepting said second data values at a plurality of second predetermined setpoints and for interpolating said second data values to yield second interpolated values; and generating, in response to said first and second interpolated values, the values that form the table.

21. The method in claim 20 wherein said first and second data value accepting and interpolating steps comprise the steps of processing said first and second data values, respectively, to yield interpolated data values for all possible input dot areas associated with said first and second data values.

22. The method in claim 21 wherein said value generating step comprises the steps of:

selecting a corresponding one of said second interpolated values that is y closest of all of the second interpolated values one of the first interpolated values; and writing an index value with said corresponding one of the second values in a location in the table given by an index value associated with said one of the first values.

23. The method in claim 21 wherein said processing step comprises the steps of:

determining coefficients of a monotone piecewise cubic function that spans an interval defined by each pair of adjacent ones of said first data values and an interval defined by each pair of adjacent ones of said second data values; and evaluating the monotone piecewise cubic function for each such interval for said first and second data values at predefined incremental input dot areas that fall on the ends of or within that interval so as to collectively yield said first and second interpolated values, respectively.

24. The method in claim 20 wherein said tone reproduction characteristic is dot gain.

25. The method in claim 24 wherein said digitized values are continuous tone (contone) values.

26. The method in claim 25 wherein said input image is a color image and output image is a color halftone proof image formed of properly registered color halftone separations.

27. The method in claim 26 wherein, for each of said color halftone separations, said operating condition is defined by a color at which said separation is to be written by the marking engine, a value of maximum solid area density and dot font shape that are to be written by the marking engine in said each separation, and a screen ruling that is to be used in generating said each separation.

28. In a direct digital color proofing system for generating a color halftone proof image from incoming digitized pre-press continuous tone (contone) data for an input image, said system having a means for processing the incoming pre-press contone data to yield screened halftone separation data representing halftone separations that are to collectively form the proof image, a marking engine for writing each of said halftone separations with proper registration so as to form said proof image, and control means connected to said processing means and said marking engine, wherein said processing means and said marking engine collectively form an imaging chain having a native dot gain characteristic, a method for generating the proof image such that the proof image is substantially free of corruption attributable to the native dot gain characteristic, said method comprising the steps of:

forming, in response to first data values representing a desired dot gain characteristic of the input image and to second data values representing the native dot gain characteristic of the imaging chain, a table of values representing the first data values modified by an inverse function of the second data values; and routing each one of a plurality of incoming digitized values that collectively represent each one of a plurality of continuous tone separations through the table to produce a corresponding modified value therefor so as to form a plurality of modified values;

converting each of the modified values for each one of said separations into a corresponding halftone bit pattern so as to form a plurality of halftone bit patterns; and applying each of said corresponding halftone bit patterns to said marking engine so as to write said one separation on a pre-defined media.

29. The method in claim 28 wherein the first data values represent the desired dot gain characteristic of the input image that is to be reproduced at a specific operating condition of the imaging chain, and the second data values represent the actual dot gain characteristic of the imaging chain obtained at said operating condition.

30. The method in claim 29 wherein said table forming step comprises the steps of:

first accepting said first data values at a plurality of first predetermined setpoints and for interpolating said first data values to yield first interpolated values;

second accepting said second data values at a plurality of second predetermined setpoints and for interpolating said second data values to yield second interpolated values; and generating, in response to said first and second interpolated values, the values that form the table.

31. The method in claim 30 wherein said first and second data value accepting and interpolating steps comprises the step of processing said first and second data values, respectively, to yield interpolated data values for all possible input dot areas associated with said first and second data values.

32. The method in claim 31 wherein said value generating step comprises the steps of:

selecting a corresponding one of said second interpolated values that is numerically closest of all of the second interpolated values to each one of the first interpolated values; and writing an index value associated with said corresponding one of the second interpolated values in a location in the table given by an index value associated with said one of the first interpolated values.

33. The method in claim 31 wherein said processing step comprises the steps of:

determining coefficients of a monotone piecewise cubic function that spans an interval defined by each pair of adjacent ones of said first data values and an interval defined by each pair of adjacent ones of said second data values; and evaluating the monotone piecewise cubic function for each such interval for said first and second data values at predefined incremental input dot areas that fall on the ends of or within that interval so as to collectively yield said first and second interpolated values, respectively.

34. The method in claim 31 wherein, for each of said color halftone separations, said operating condition is defined by a color at which said separation is to be written by the marking engine, a value of solid area density and dot font shape that are to be written by the marking engine in said each separation, and a screen ruling that is to be used in generating said each separation.

* * * * *